US010268971B2

(12) United States Patent
Nishimura et al.

(10) Patent No.: US 10,268,971 B2
(45) Date of Patent: *Apr. 23, 2019

(54) DISPLAY METHOD, DISPLAY DEVICE, AND RECORDING MEDIUM

(71) Applicant: FUJITSU LIMITED, Kawasaki-shi, Kanagawa (JP)

(72) Inventors: Takehiko Nishimura, Kawasaki (JP); Yuki Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,770

(22) Filed: Sep. 19, 2017

(65) Prior Publication Data

US 2018/0004194 A1 Jan. 4, 2018

Related U.S. Application Data

(63) Continuation of application No. 14/528,417, filed on Oct. 30, 2014, now Pat. No. 9,791,853.

(30) Foreign Application Priority Data

Dec. 3, 2013 (JP) .................................. 2013-250622

(51) Int. Cl.
  *G06F 19/00* (2018.01)
  *G06Q 10/06* (2012.01)
  *G05B 19/418* (2006.01)
  *G06T 11/20* (2006.01)

(52) U.S. Cl.
  CPC ....... *G06Q 10/06* (2013.01); *G05B 19/41875* (2013.01); *G05B 2219/31455* (2013.01);
  (Continued)

(58) Field of Classification Search
  CPC .. G06Q 10/06; G05B 19/409; G05B 23/0272; G05B 2219/31472; G05B 19/41875; Y02P 90/08; Y02P 90/22; G06T 11/206
  See application file for complete search history.

(56) References Cited

U.S. PATENT DOCUMENTS

2006/0238538 A1* 10/2006 Kapler .................. G06Q 10/06
    345/440
2008/0219544 A1  9/2008 Tasaki et al.
    (Continued)

FOREIGN PATENT DOCUMENTS

CN    101414186 A    4/2009
JP    2005-293274    10/2005
    (Continued)

OTHER PUBLICATIONS

Third Party Submission of References mailed Mar. 7, 2017 in corresponding Japanese Patent Application No. 2013-209707.
(Continued)

*Primary Examiner* — Tuan A Vu
(74) *Attorney, Agent, or Firm* — Staas & Halsey LLP

(57) ABSTRACT

A display method of a manufacturing status to visualize a manufacturing status of products each manufactured through processing performed by a plurality of apparatuses included in a manufacturing line includes identifying, for each product to be manufactured in a certain manufacturing unit, a starting time or an ending time or both of the processing performed on the product by a first apparatus and a starting time or an ending time or both of the processing performed on the product by a second apparatus based on log information of the first apparatus and log information of the second apparatus, the first and the second apparatuses being included in the manufacturing line, the second apparatus performing the processing after the processing performed by the first apparatus, using a processor.

7 Claims, 20 Drawing Sheets

(52) U.S. Cl.
CPC .. *G05B 2219/31472* (2013.01); *G06T 11/206* (2013.01); *Y02P 90/14* (2015.11); *Y02P 90/22* (2015.11)

(56) References Cited

U.S. PATENT DOCUMENTS

| | | | |
|---|---|---|---|
| 2009/0024239 | A1 | 1/2009 | Yoshioka et al. |
| 2010/0217418 | A1* | 8/2010 | Fontanot ................ G06Q 10/06 700/100 |
| 2011/0071869 | A1 | 3/2011 | O'Brien et al. |
| 2012/0041576 | A1 | 2/2012 | Mikkelsen |
| 2012/0253869 | A1 | 10/2012 | Ansley |

FOREIGN PATENT DOCUMENTS

| | | |
|---|---|---|
| JP | 2006-146459 | 6/2006 |
| JP | 2006-302096 | 11/2006 |
| JP | 2007-79933 | 3/2007 |
| JP | 2009-25851 | 2/2009 |
| JP | 2009-116842 | 5/2009 |
| JP | 2010-176369 | 8/2010 |

OTHER PUBLICATIONS

Chinese Office Action dated Jan. 25, 2017 in corresponding Chinese Patent Application No. 201410708752.3.
Notice of Allowance, dated Jun. 19, 2017, in U.S. Appl. No. 14/528,417.
U.S. Appl. No. 14/528,419, filed Oct. 30, 2014, Takehiko Nishimura et al., Fujitsi Limited.

* cited by examiner

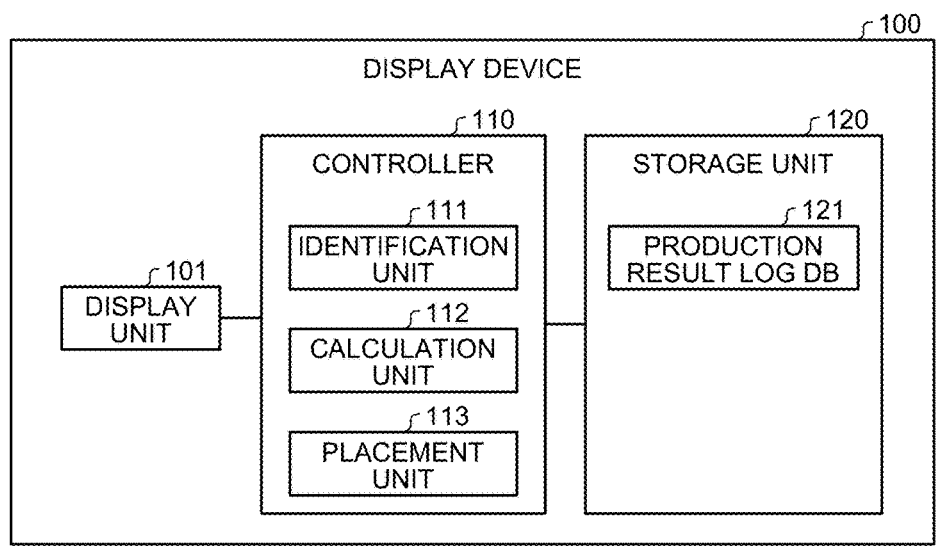

FIG.4

| PRODUCT NUMBER | PROCESS 1 | PROCESS 2 | PROCESS 3 |
|---|---|---|---|
| SN0001 | ? | 0:07:54 | 0:07:38 |
| SN0002 | 0:10:56 | 0:12:31 | 0:14:08 |
| SN0003 | 0:03:42 | 0:05:30 | 0:15:30 |
| SN0004 | 0:05:33 | 0:17:50 | 0:10:09 |
| SN0005 | 0:04:25 | 0:07:11 | 0:09:09 |

FIG.5

| PRODUCT NUMBER | PROCESS 1 | PROCESS 2 | PROCESS 3 |
|---|---|---|---|
| SN0001 | 9:08:38 | 9:14:08 | 9:19:38 |
| SN0002 | 9:11:38 | 9:19:38 | 9:25:08 |
| SN0003 | 9:14:38 | 9:25:08 | 9:30:38 |
| SN0004 | 9:17:38 | 9:30:38 | 9:36:08 |
| SN0005 | 9:20:38 | 9:36:08 | 9:41:38 |

| PRODUCT NUMBER | PROCESS 1 | PROCESS 2 | PROCESS 3 |
|---|---|---|---|
| SN0001 | 9:00:00 | 9:07:47 | 9:22:48 |
| SN0002 | 9:03:42 | 9:16:42 | 9:39:02 |
| SN0003 | 9:09:58 | 9:22:59 | 9:44:24 |
| SN0004 | 9:14:40 | 9:31:10 | 9:55:12 |
| SN0005 | 9:22:13 | 9:37:30 | 10:06:36 |

FIG.8

| PRODUCT NUMBER | PROCESS 1 | PROCESS 2 | PROCESS 3 |
|---|---|---|---|
| SN0001 | 0:03:42 | 0:08:55 | 0:09:37 |
| SN0002 | 0:06:16 | 0:06:17 | 0:03:27 |
| SN0003 | 0:04:42 | 0:08:11 | 0:07:19 |
| SN0004 | 0:07:33 | 0:06:20 | 0:06:34 |
| SN0005 | 0:03:33 | 0:07:53 | 0:09:05 |

FIG.9

| PRODUCT NUMBER | PROCESS 1 | PROCESS 2 | PROCESS 3 |
|---|---|---|---|
| SN0001 | 9:00:00 | 9:03:15 | 9:06:27 |
| SN0002 | 9:03:15 | 9:09:27 | 9:12:39 |
| SN0003 | 9:06:30 | 9:15:39 | 9:18:51 |
| SN0004 | 9:09:45 | 9:21:51 | 9:25:03 |
| SN0005 | 9:13:00 | 9:28:03 | 9:31:15 |

| PRODUCT NUMBER | PROCESS 1 START | PROCESS 1 END | PROCESS 2 START | PROCESS 2 END | PROCESS 3 START | PROCESS 3 END |
|---|---|---|---|---|---|---|
| SN0001 | 9:00:00 | 9:02:05 | 9:02:16 | 9:06:05 | 9:06:17 | 9:10:19 |
| SN0002 | 9:03:36 | 9:05:50 | 9:08:00 | 9:11:46 | 9:11:56 | 9:16:24 |
| SN0003 | 9:06:30 | 9:08:34 | 9:12:29 | 9:16:00 | 9:16:44 | 9:20:50 |
| SN0004 | 9:08:54 | 9:10:55 | 9:17:20 | 9:21:25 | 9:21:52 | 9:26:13 |
| SN0005 | 9:11:20 | 9:13:27 | 9:23:39 | 9:28:23 | 9:28:43 | 9:35:16 |

| PRODUCT NUMBER | PROCESS 1 | | PROCESS 2 | | PROCESS 3 | |
|---|---|---|---|---|---|---|
| | PRODUCTION | TRANSFERRING | PRODUCTION | TRANSFERRING | PRODUCTION | TRANSFERRING |
| SN0001 | 0:02:05 | 0:00:11 | 0:03:49 | 0:00:12 | 0:04:02 | 0:00:10 |
| SN0002 | 0:02:13 | 0:02:10 | 0:03:46 | 0:00:10 | 0:04:27 | 0:00:14 |
| SN0003 | 0:02:03 | 0:03:55 | 0:03:31 | 0:00:44 | 0:04:06 | 0:00:12 |
| SN0004 | 0:02:00 | 0:06:26 | 0:04:04 | 0:00:28 | 0:04:20 | 0:00:12 |
| SN0005 | 0:02:07 | 0:10:12 | 0:04:44 | 0:00:19 | 0:06:34 | 0:00:16 |

| PRODUCT NUMBER | PROCESS 1 | PROCESS 2 | PROCESS 3 |
|---|---|---|---|
| SN0001 | ? | ? | ? |
| SN0002 | 0:01:31 | 0:01:55 | 0:01:37 |
| SN0003 | 0:00:40 | 0:00:43 | 0:00:22 |
| SN0004 | 0:00:20 | 0:01:20 | 0:01:02 |
| SN0005 | 0:00:25 | 0:02:14 | 0:02:30 |

FIG.21

| PRODUCT NUMBER | PROCESS 1 | PROCESS 2 | PROCESS 3 |
|---|---|---|---|
| SN0001-S | 9:00:00 | 9:02:11 | 9:05:52 |
| SN0001-E | 9:02:00 | 9:05:42 | 9:09:52 |
| SN0002-S | 9:02:20 | 9:06:02 | 9:10:13 |
| SN0002-E | 9:04:20 | 9:09:33 | 9:14:13 |
| SN0003-S | 9:04:40 | 9:09:53 | 9:14:34 |
| SN0003-E | 9:06:40 | 9:13:24 | 9:18:34 |
| SN0004-S | 9:07:00 | 9:13:44 | 9:18:55 |
| SN0004-E | 9:09:00 | 9:17:15 | 9:22:55 |
| SN0005-S | 9:09:20 | 9:17:35 | 9:23:16 |
| SN0005-E | 9:11:20 | 9:21:06 | 9:27:16 |

DISPLAY METHOD, DISPLAY DEVICE, AND RECORDING MEDIUM

CROSS-REFERENCE TO RELATED APPLICATION

This application is a Continuation of U.S. application Ser. No. 14/528,417, filed Oct. 30, 2014, which is based upon and claims the benefit of priority of the prior Japanese Patent Application No. 2013-250622, filed on Dec. 3, 2013, the entire contents of which are incorporated herein by reference.

FIELD

The embodiments discussed herein are related to a display method, a display device, and a display program.

BACKGROUND

Techniques have been known that relate to visualization apparatuses. The visualization apparatuses trace manufacturing of products and visualize the tracings using logs indicating the manufacturing status of manufacturing lines in which a plurality of manufacturing apparatuses sequentially process the products. When detecting an abnormality, for example, such a visualization apparatus produces a visualization image indicating a process where the detected abnormality takes place on an image that visualizes cause-effect relations among various processes, and displays the produced visualization image.

Refer to Japanese Laid-open Patent Publication No. 2009-116842, for example.

However, it is difficult for such a related apparatus to display a visualization image that allows users to readily visually recognize abnormalities in the manufacturing status.

For example, when a processing time in certain processing is longer than a standard processing time, such an excess in processing time may indicate an abnormality in a manufacturing apparatus or may be allowable according to functions or processing capacity of the manufacturing apparatus. Thus, it is difficult for a user to determine whether the processing is in an abnormal status even though the related visualization apparatus displays that the processing takes a longer time than the standard processing time.

SUMMARY

According to an aspect of the embodiments, a display method is a display method of a manufacturing status to visualize a manufacturing status of products each manufactured through processing performed by a plurality of apparatuses included in a manufacturing line. The display method includes: identifying, for each product to be manufactured in a certain manufacturing unit, a starting time or an ending time or both of the processing performed on the product by a first apparatus and a starting time or an ending time or both of the processing performed on the product by a second apparatus based on log information of the first apparatus and log information of the second apparatus, the first and the second apparatuses being included in the manufacturing line, the second apparatus performing the processing after the processing performed by the first apparatus, using a processor; placing, on a first temporal axis, the starting time or the ending time or both identified for each product in the first apparatus, the first temporal axis indicating the starting time or the ending time or both of the processing performed on each product by the first apparatus, using the processor; placing, on a second temporal axis, the starting time or the ending time or both identified for each product in the second apparatus, the second temporal axis indicating the starting time or the ending time or both of the processing performed on each product by the second apparatus, the second temporal axis being in parallel with the first temporal axis, using the processor; placing, for each product, a line that connects a point placed on the first temporal axis and another point placed on the second temporal axis, using the processor; and displaying an area interposed between a first line and a second line such that the area is in a visible state and overlaps with the placed lines, the first line connecting points placed on the first temporal axis and the second temporal axis, the point placed on the first temporal axis indicating a time at which the processing performed on a first product by the first apparatus is to start or end, the point placed on the second temporal axis indicating another time at which the processing performed on the first product by the second apparatus is to start or end, the times being times when the first product is normally processed by both of the first and the second apparatuses, the first product being manufactured first in the certain manufacturing unit, the second line connecting other points placed on the first temporal axis and the second temporal axis, the point placed on the first temporal axis indicating a time at which the processing performed on a second product by the first apparatus is to start or end, the point placed on the second temporal axis indicating another time at which the processing performed on the second product by the second apparatus is to start or end, the times being times when all of the products included in the certain manufacturing unit are normally processed by both of the first and the second apparatuses, the second product being manufactured last in the certain manufacturing unit, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram illustrating a structure of a display device according to a first embodiment;

FIG. 2 is a schematic diagram illustrating an example of a data structure of a production result log database (DB) according to the first embodiment;

FIG. 4 is a schematic diagram illustrating an example of production periods calculated by the calculation unit according to the first embodiment;

FIG. 5 is a schematic diagram illustrating an example of ideal data calculated by the calculation unit according to the first embodiment;

FIG. 6 is a schematic diagram illustrating another example of the data structure of the production result log DB according to the first embodiment;

FIG. 8 is a schematic diagram illustrating another example of the production periods calculated by the calculation unit according to the first embodiment;

FIG. 9 is a schematic diagram illustrating another example of the ideal data calculated by the calculation unit according to the first embodiment;

FIG. 18 is a schematic diagram illustrating an example of the data structure of a production result log DB according to the second embodiment;

FIG. 19 is a schematic diagram illustrating an example of the production periods and transferring periods that are calculated by the calculation unit according to the second embodiment;

FIG. 20 is a schematic diagram illustrating an example of preparation periods calculated by the calculation unit according to the second embodiment;

FIG. 21 is a schematic diagram illustrating an example of the ideal data calculated by the calculation unit according to the second embodiment;

DESCRIPTION OF EMBODIMENTS

Figure 3:
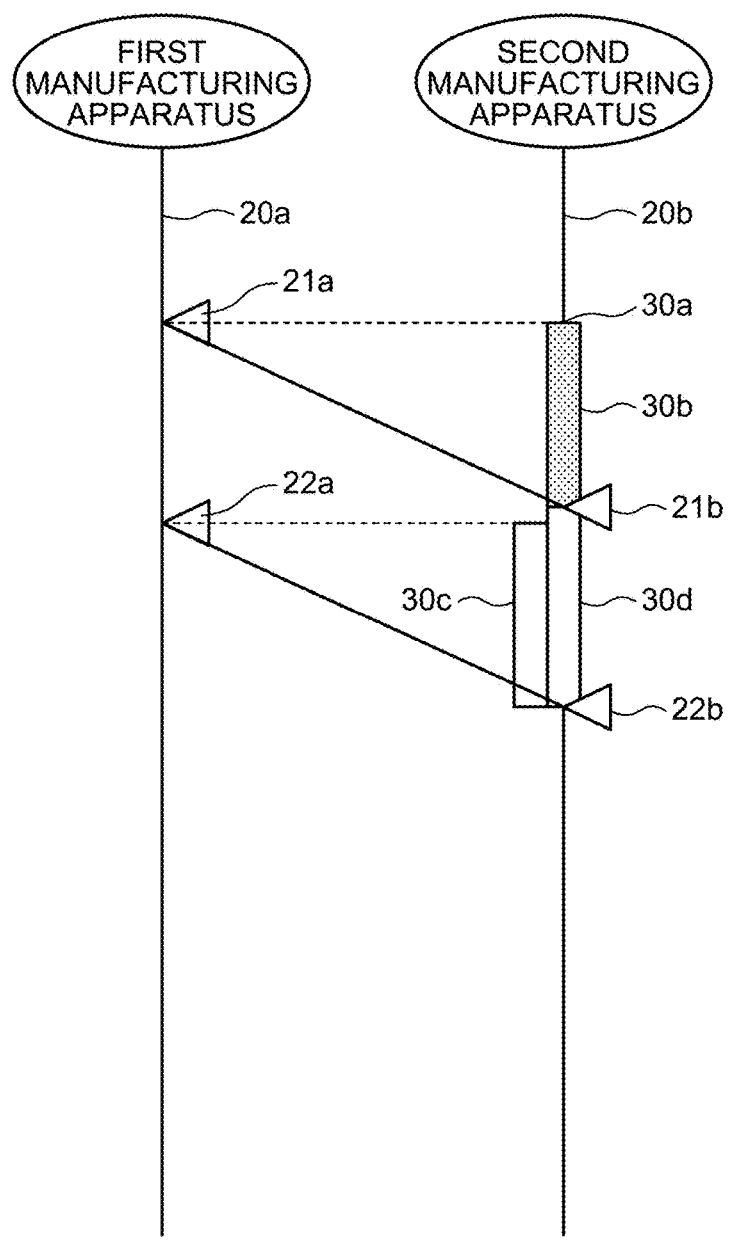
FIG. 3 is a schematic diagram for explaining processing performed by a calculation unit according to the first embodiment to calculate a starting time.

Preferred embodiments will be explained with reference to accompanying drawings. The embodiments do not limit the invention. The embodiments can be performed in any combination of them without inconsistency among them. In the following description, functional structures performing the same processing and the same processing previously described are labeled with the same numerals, and descriptions thereof are omitted.

[a] First Embodiment

Functional Structure of Display Device

The following describes an example of a functional structure of a display device 100 according to a first embodiment. FIG. 1 is a functional block diagram illustrating the structure of the display device according to the first embodiment. As illustrated in FIG. 1, the display device 100 includes a display unit 101, a controller 110, and a storage unit 120. The display unit 101 displays, on a monitor, a result of processing performed by the display device 100. Details of display data displayed on the display unit 101 are described later. Values of times used in the following description take into account values after the decimal point, which values are not illustrated. The values, thus, may include an error of about one second in some cases.

Structure of Storage Unit

The storage unit 120 stores therein various types of information used for processing that visualizes the manufacturing status of products, each of which is manufactured through processing sequentially performed by a plurality of manufacturing apparatuses included in a manufacturing line. The storage unit 120 includes a production result log database (DB) 121, for example. The storage unit 120 is a semiconductor memory element such as a random access memory (RAM), a read-only memory (ROM), or a flash memory, or a storage device such as a hard disk drive or an optical disc drive.

The production result log DB 121 stores therein logs of processing performed by the manufacturing apparatuses included in the manufacturing line. For example, the production result log DB 121 stores therein data that indicates, for each product, information capable of identifying a starting time or an ending time of processing in a process 1 to a process 7 sequentially performed by a first manufacturing apparatus to a seventh manufacturing apparatus included in the manufacturing line.

FIG. 2 is a schematic diagram illustrating an example of a data structure of the production result log DB according to the first embodiment. In the example illustrated in FIG. 2, the production result log DB 121 stores therein product numbers each of which identifies a processing target product and ending times each of which is a time when the processing in the process ends in association with one another.

For example, a first record of the production result log DB 121 indicates that the process 1 of the product indicated by a product number "SN0001" ends at "9:08:38", the process 2 thereof ends at "9:16:32", and the process 3 thereof ends at "9:24:10". A second record of the production result log DB 121 indicates that the process 1 of the product indicated by a product number "SN0002" ends at "9:19:34", the process 2 thereof ends at "9:32:05", and the process 3 thereof ends at "9:46:12". The production result log DB 121 stores therein the information indicating the ending times of the other products in the respective processes as the other records. In the example of FIG. 2, the ending times in the processes 1 to 3 are presented for the products indicated by the product number "SN0001" to a product number "SN0005". The production result log DB 121 further stores therein the ending times in the processes 4 to 7 of the products. The production result log DB 121 further stores therein the ending times in the processes 1 to 7 of the products indicated by the product numbers "SN0006" to "SN0020". In the example illustrated in FIG. 2, the data about the respective items are stored in association with one another as the records. The data may be stored in a different manner from that illustrated in FIG. 2 as long as the relation is maintained as described above among the items associated with one another.

Structure of Controller

The controller 110 performs control for the processing that visualizes the manufacturing status of the products, each of which is manufactured through processing sequentially performed by the manufacturing apparatuses included in the manufacturing line. The controller 110 includes an identification unit 111, a calculation unit 112, and a placement unit 113, for example. The functions of the identification unit 111, the calculation unit 112, and the placement unit 113 included in the controller 110 can be achieved by a central processing unit (CPU) that executes a certain program, for example. The functions of the controller 110 can be achieved by an integrated circuit such as an application specific integrated circuit (ASIC) or a field programmable gate array (FPGA).

Structure of Identification Unit

The identification unit 111 identifies, for each product, the starting time or the ending time or both in each process based on the information stored in the production result log DB 121. Specifically, the identification unit 111 identifies each ending time associated with the product number of the product the manufacturing status of which is to be displayed out of the ending times stored in the production result log DB 121. For example, when identifying the ending time in each process of the product indicated by the product number "SN0001", the identification unit 111 identifies the ending time "9:08:38" in the process 1 associated with the product number "SN0001", and the ending time "9:16:32" in the process 2 associated with the product number "SN0001". The identification unit 111 also identifies the ending time "9:24:10" in the process 3 associated with the product number "SN0001".

Structure of Calculation Unit

The calculation unit 112 calculates, for each product and for each process, a production period, which is a period in which the processing is performed in the process, using the production result log DB 121. The calculation unit 112 identifies, for each process, the shortest production period out of the calculated production periods as an ideal period. The calculation unit 112 calculates ideal ending times when ideal processing is performed on all of the products the logs of which are stored in the production result log DB 121 using the ideal periods identified for the respective processes. In the following description, a set of the ideal ending times in the respective processes calculated by the calculation unit 112 on all of the products is described as ideal data.

First Example of Processing Performed by the Calculation Unit 112

The production result log DB 121 illustrated in FIG. 2 stores therein the ending times in the respective processes for each of the products but no starting times, each of which indicates a time when the processing starts in the process. In such a case where the production result log DB 121 stores therein only the ending times in the respective processes, the calculation unit 112 estimates, for each product, the starting times in the respective processes using the stored ending times. The calculation unit 112 calculates, for each product, the production periods in the respective processes using the estimated starting times and the ending times stored in the production result log DB 121. The calculation unit 112 identifies, for each process, the shortest production period out of the calculated production periods as the ideal period.

The following describes an example of the processing performed by the calculation unit 112 with reference to FIG. 3. FIG. 3 is a schematic diagram for explaining the processing performed by the calculation unit according to the first embodiment to calculate the starting time. As illustrated in FIG. 3, a symbol 21a indicating the ending time of the first product and a symbol 22a indicating the ending time of the second product, which is processed next to the first product, are placed on a temporal axis 20a on which the ending times of the respective products in the process 1 performed by the first manufacturing apparatus are placed. In addition, a symbol 21b indicating the ending time of the first product and a symbol 22b indicating the ending time of the second product are placed on a temporal axis 20b on which the ending times of the respective products in the process 2 performed by the second manufacturing apparatus are placed.

When the products are manufactured by the processing sequentially performed by a plurality of apparatuses included in the manufacturing line, the first product is processed in the process 1 and thereafter processed in the process 2, for example. Because of such a sequence, the starting time when the second manufacturing apparatus starts processing the first product is at least after the ending time 21a when the first manufacturing apparatus ends the processing of the first product, for example. When the apparatuses each perform only a single piece of processing, the second manufacturing apparatus starts processing the second product after the second manufacturing apparatus ends the processing of the first product. Because of such a sequence, the starting time when the second manufacturing apparatus starts processing the second product is at least after the ending time 21b when the second manufacturing apparatus ends the processing of the first product, for example. In a similar manner as the first product, the starting time when the second manufacturing apparatus starts processing the second product is at least after the ending time 22a when the first manufacturing apparatus ends the processing of the second product.

The calculation unit 112 thus performs the following processing. The calculation unit 112 selects the later ending time of either the ending time 22a when the process 1 of the second product ends or the ending time 21b when the process 2 of the first product ends. The calculation unit 112 calculates the production period using the selected ending time as the starting time when the process 2 of the second product starts. For example, the calculation unit 112 calculates a production period 30b of the first product in the process 2 using a starting time 30a and the ending time indicated with the symbol 21b. The calculation unit 112 determines, as the production period of the first product in the process 2, the shorter period of either a production period 30c from the time indicated with the symbol 22a to the time indicated with the symbol 22b or a production period 30d from the time indicated with the symbol 21b to the time indicated with the symbol 22b. In the example illustrated in FIG. 3, the production period 30c is shorter than the production period 30d. Thus, the calculation unit 112 determines the production period 30c as the production period of the second product in the process 2.

For example, when calculating the production period in the process 2 of the product indicated by the product number "SN0002", the calculation unit 112 performs the following processing using the production result log DB 121 illustrated in FIG. 2. The calculation unit 112 compares the ending time "9:19:34" of the product indicated by the product number "SN0002" in the process 1 with the ending time "9:16:32" of the product indicated by the product number "SN0001" in the process 2, and identifies the ending time "9:19:34" as the later time. The calculation unit 112, then, identifies the production period "0:12:31" of the product indicated by the product number "SN0002" in the process 2 using the identified ending time "9:19:34" as the starting time of the product indicated by the product number "SN0002" in the process 2.

FIG. 4 is a schematic diagram illustrating an example of the production periods calculated by the calculation unit according to the first embodiment. The calculation unit 112 performs the processing described above on all of the processes and for each product, thereby identifying the production periods in the respective processes for each product as illustrated in FIG. 4. It is difficult for the calculation unit 112 to calculate the starting time of the production period in the process 1 in relation to the product number "SN0001". The calculation unit 112 thus stores the fact that no calculation can be performed". In the example illustrated in FIG. 4, the fact that no calculation can be performed is expressed by "?". The expression manner is not limited to this example. For example, a blank may be stored. The calculation unit 112 calculates the production periods for each of the other products and for each of the other processes besides the production periods illustrated in FIG. 4.

For example, the calculation unit 112 calculates the production period "0:07:54" in the process 2 and the production period "0:07:38" in the process 3 in relation to the product indicated by the product number "SN0001". The calculation unit 112 calculates the production period "0:10:56" in the process 1, the production period "0:12:31" in the process 2, and the production period "0:14:08" in the process 3 in relation to the product indicated by the product number "SN0002". The calculation unit 112 calculates the production period "0:03:42" in the process 1, the production period "0:05:30" in the process 2, and the production period "0:15:30" in the process 3 in relation to the product indicated by the product number "SN0003". The calculation unit 112 calculates the respective production periods of the other products in the other processes.

The calculation unit 112 then identifies, for each process, the shortest production period as the ideal period. In the example illustrated in FIG. 4, the calculation unit 112 identifies the ideal period of the process 1 as "0:03:42", the ideal period of the process 2 as "0:05:30", and the ideal period of the process 3 as "0:07:38", for example. The following description is based on the assumption that the ideal period of the process 1 is "0:03:00", the ideal period of the process 2 is "0:05:30", and the ideal period of the process 3 is "0:05:30" as a result of the calculation of the production periods performed by the calculation unit 112 on all of the products and processes.

The calculation unit 112 calculates the ideal data using the calculated ideal periods. The ideal data indicates the times at which the processing of the respective products is to be started or ended in the respective processes when the respective products are normally processed in the respective processes, i.e., ideal processing is performed. For example, the calculation unit 112 calculates the ideal ending time of the product indicated by the product number "SN0002" in the process 1 by adding the ideal period of the process 1 to the ending time of the product indicated by the product number "SN0001", which is manufactured at the beginning, in the process 1. The calculation unit 112 calculates the ideal ending time of the product indicated by the product number "SN0001" in the process 2 by adding the ideal period of the process 2 to the ending time of the product indicated by the product number "SN0001" in the process 1.

As a result of the processing described above, the calculation unit 112 calculates the ideal data illustrated in FIG. 5. FIG. 5 is a schematic diagram illustrating an example of the ideal data calculated by the calculation unit according to the first embodiment. For example, the calculation unit 112 calculates the ideal ending time "9:08:38" in the process 1, the ideal ending time "9:14:08" in the process 2, and the ideal ending time "9:19:38" in the process 3 of the product indicated by the product number "SN0001". The calculation unit 112 calculates the ideal ending time "9:11:38" in the process 1, the ideal ending time "9:19:38" in the process 2, and the ideal ending time "9:25:08" in the process 3 of the product indicated by the product number "SN0002". The calculation unit 112 calculates the ideal periods for each of the other products and for each of the other processes besides the production periods illustrated in FIG. 5.

Second Example of Processing Performed by the Calculation Unit 112

In some cases, the production result log DB 121 stores therein, for each product, the starting times in the respective processes but no ending times of the processing in the respective processes. In such a case, the calculation unit 112 estimates, for each product, the ending times in the respective processes using the starting times stored in the production result log DB 121. The calculation unit 112 calculates, for each product, the production periods, in which the processing of the respective processes is performed, using the starting times and the estimated ending times, and identifies, for each process, the shortest production period out of the calculated production periods as the ideal period.

The following describes an example of the processing performed by the calculation unit 112 when the production result log DB 121 stores therein, for each product, the starting times in the respective processes with reference to FIGS. 6 to 9. With reference to FIG. 6, an example of the production result log DB 121 is described that stores therein the starting times in the respective processes for each product. FIG. 6 is a schematic diagram illustrating another example of the data structure of the production result log DB according to the first embodiment. In the example illustrated in FIG. 6, the production result log DB 121 stores therein the product numbers each of which identifies a processing target product and the starting times each of which is a time when the processing in the process starts in association with one another.

For example, the first record of the production result log DB 121 indicates that the process 1 of the product indicated by the product number "SN0001" starts at "9:00:00", the process 2 thereof starts at "9:07:47", and the process 3 thereof starts at "9:22:48". The second record of the production result log DB 121 indicates that the process 1 of the product indicated by the product number "SN0002" starts at "9:03:42", the process 2 thereof starts at "9:16:42", and the process 3 thereof starts at "9:39:02". The production result log DB 121 stores therein the information indicating the ending times in the respective processes of other products as other records.

Figure 7:
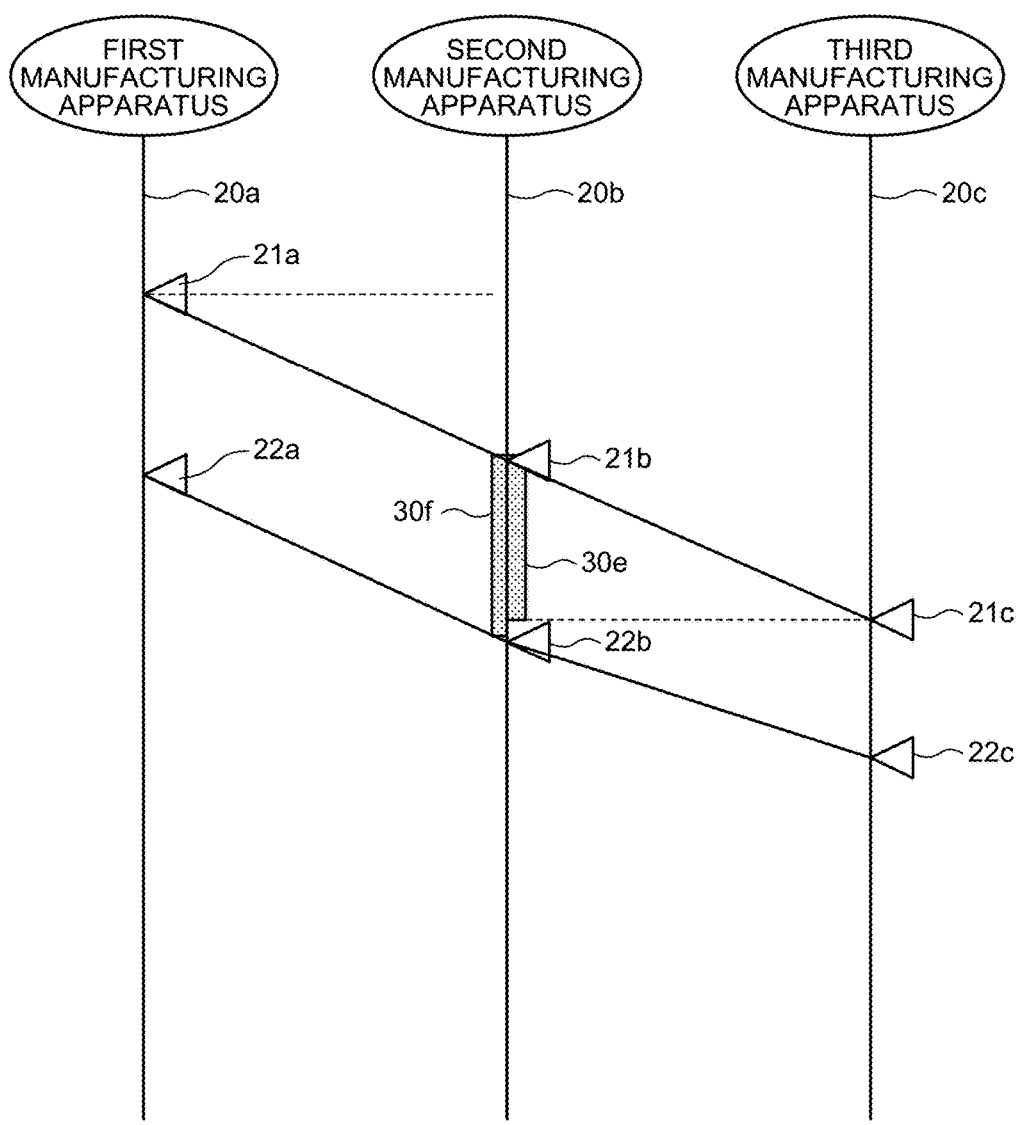
FIG. 7 is a schematic diagram for explaining the processing performed by the calculation unit according to the first embodiment to calculate the ending time.

With reference to FIG. 7, the following describes another example of the processing performed by the calculation unit 112 to calculate the ending time. FIG. 7 is a schematic diagram for explaining the processing performed by the calculation unit according to the first embodiment to calculate the ending time. As illustrated in FIG. 7, the symbol 21a indicating the starting time of the first product and the symbol 22a indicating the starting time of the second product, which is processed next to the first product, are placed on the temporal axis 20a on which the starting times of the respective products in the process 1 are placed, in a similar manner as that described with reference to FIG. 3. In addition in FIG. 7, the symbol 21b indicating the starting time of the first product and the symbol 22b indicating the starting time of the second product are placed on the temporal axis 20b on which the starting times of the respective products in the process 2 are placed. In addition in FIG. 7, a symbol 21c indicating the starting time of the first product and a symbol 22c indicating the starting time of the second product are placed on a temporal axis 20c on which the starting times of the respective products in the process 3, which is next to the process performed by the second manufacturing apparatus, are placed.

The ending time of the processing performed on the first product in the process 2 is before at least the starting time of the processing performed on the first product in the process 3, i.e., before the time indicated with the symbol 21c. The ending time of the processing performed on the first product in the process 2 is before at least the starting time of the processing performed on the second product in the process 2, i.e., before the time indicated with the symbol 22b. The calculation unit 112 thus selects the earlier time of either the time indicated with the symbol 21c or the time indicated with the symbol 22b as the ending time of the first product in the process 2. The calculation unit 112 determines, as the production period of the first product in the process 2, the shorter period of either a production period 30e from the time indicated with the symbol 21b to the time indicated with the symbol 21c or a production period 30f from the time indicated with the symbol 21b to the time indicated with the symbol 22b. In the example illustrated in FIG. 7, the production period 30e is shorter than the production period 30f. Thus, the calculation unit 112 determines the production period 30e as the production period of the first product in the process 2.

For example, when calculating the production period in the process 2 of the product indicated by the product number "SN0002", the calculation unit 112 performs the following processing using the production result log DB 121 illustrated in FIG. 6. The calculation unit 112 compares the starting time "9:39:02" of the product indicated by the product number "SN0002" in the process 3 with the starting time "9:22:59" of the product indicated by the product number "SN0003" in the process 2, and identifies the starting time "9:22:59" as the earlier time. The calculation unit 112, then, identifies the production period "0:06:17" of the product indicated by the product number "SN0002" in the process 2 using the identified starting time "9:22:59" as the ending time of the product indicated by the product number "SN0002" in the process 2.

The calculation unit 112 performs the processing described above on the processes performed by all of the manufacturing apparatuses for each product, thereby identifying the production periods in the respective processes for each product as illustrated in FIG. 8. FIG. 8 is a schematic diagram illustrating another example of the production periods calculated by the calculation unit according to the first embodiment. The calculation unit 112 calculates the production period "0:03:42" in the process 1, the production period "0:08:55" in the process 2, and the production period "0:09:37" in the process 3 in relation to the product indicated by the product number "SN0001". The calculation unit 112 calculates the production period "0:06:16" in the process 1, the production period "0:06:17" in the process 2, and the production period "0:03:27" in the process 3 in relation to the product indicated by the product number "SN0002". The calculation unit 112 calculates the production period "0:04:42" in the process 1, the production period "0:08:11" in the process 2, and the production period "0:07:19" in the process 3 in relation to the product indicated by the product number "SN0003". The calculation unit 112 calculates the respective production periods of other products in other processes.

The calculation unit 112 then identifies the shortest production period as the ideal period for each of the processes performed by the respective manufacturing apparatuses. In the example illustrated in FIG. 8, the calculation unit 112 identifies the ideal period of the process 1 as "0:03:33", the ideal period of the process 2 "0:06:17", and the ideal period of the process 3 as "0:03:27", for example.

The following description is based on the assumption that the ideal period of the process 1 is "0:03:15", the ideal period of the process 2 is "0:06:12", and the ideal period of the process 3 is "0:03:12" as a result of the calculation of the production periods performed by the calculation unit 112 on all of the products and processes.

Thereafter, the calculation unit 112 calculates the ideal starting time of the product indicated by the product number "SN0002" in the process 1 by adding the ideal period of the process 1 to the starting time of the product indicated by the product number "SN0001", which is manufactured at the beginning, in the process 1. The calculation unit 112 calculates the ideal ending time of the product indicated by the product number "SN0001" in the process 2 by adding the ideal period of the process 2 to the ending time of the product indicated by the product number "SN0001" in the process 1.

As a result of the processing described above, the calculation unit 112 calculates the ideal data illustrated in FIG. 9. FIG. 9 is a schematic diagram illustrating another example of the ideal data calculated by the calculation unit according to the first embodiment. For example, the calculation unit 112 calculates the ideal starting time "9:00:00" in the process 1, the ideal starting time "9:03:15" in the process 2, and the ideal starting time "9:06:27" in the process 3 in relation to the product indicated by the product number "SN0001". The calculation unit 112 calculates the ideal starting time "9:03:15" in the process 1, the ideal starting time "9:09:27" in the process 2, and the ideal starting time "9:12:39" in the process 3 in relation to the product indicated by the product number "SN0002". The calculation unit 112 calculates the ideal starting time for each of the other products and for each of the other processes besides the starting times illustrated in FIG. 9.

Structure of Placement Unit

Referring back to FIG. 1, the placement unit 113 places the temporal axes for the respective processes parallel to one another. Each temporal axis indicates either the starting times or the ending times of the processing performed on the respective products. The placement unit 113 then places the identified starting times or the ending times or both identified for the respective products on the placed temporal axes using either the starting times or the ending times or both that are stored in the production result log DB 121. The placement unit 113 produces a graph in which a line connecting the starting times or the ending times on the respective temporal axes is placed for each product.

The placement unit 113 performs the following processing using the ideal data calculated by the calculation unit 112. The placement unit 113 acquires, from the calculation unit 112, the ideal starting time or the ideal ending time of the first product, which is first manufactured out of the products the logs of which are stored in the production result log DB 121. The placement unit 113 then places the points indicating the ideal starting times or the ideal ending times of the first product on the temporal axes of the respective processes, and places a first line that connects the respective placed points on the produced graph to overlap with the graph.

The placement unit 113 acquires, from the calculation unit 112, the ideal starting times or the ideal ending times of the last manufactured product when all of the products the logs of which are stored in the production result log DB 121 are processed normally in all of the processes. The placement unit 113 then places the points indicating the ideal starting times or the ideal ending times of the last manufactured product on the temporal axes of the respective processes, and places a second line that connects the respective placed points on the graph to overlap with the graph. The placement unit 113 then outputs a graph in which the first and the second lines are placed on the already produced graph to the display unit 101.

The placement unit 113 produces a graph that indicates, for each product, the actual manufacturing status in the respective processes using the starting times or the ending times stored in the production result log DB 121. The placement unit 113 places, on the graph indicating the actual manufacturing status, the graph indicating the manufacturing status of the first and the last processed products when all of the products are ideally processed using the ideal data calculated by the calculation unit 112.

Figure 10:
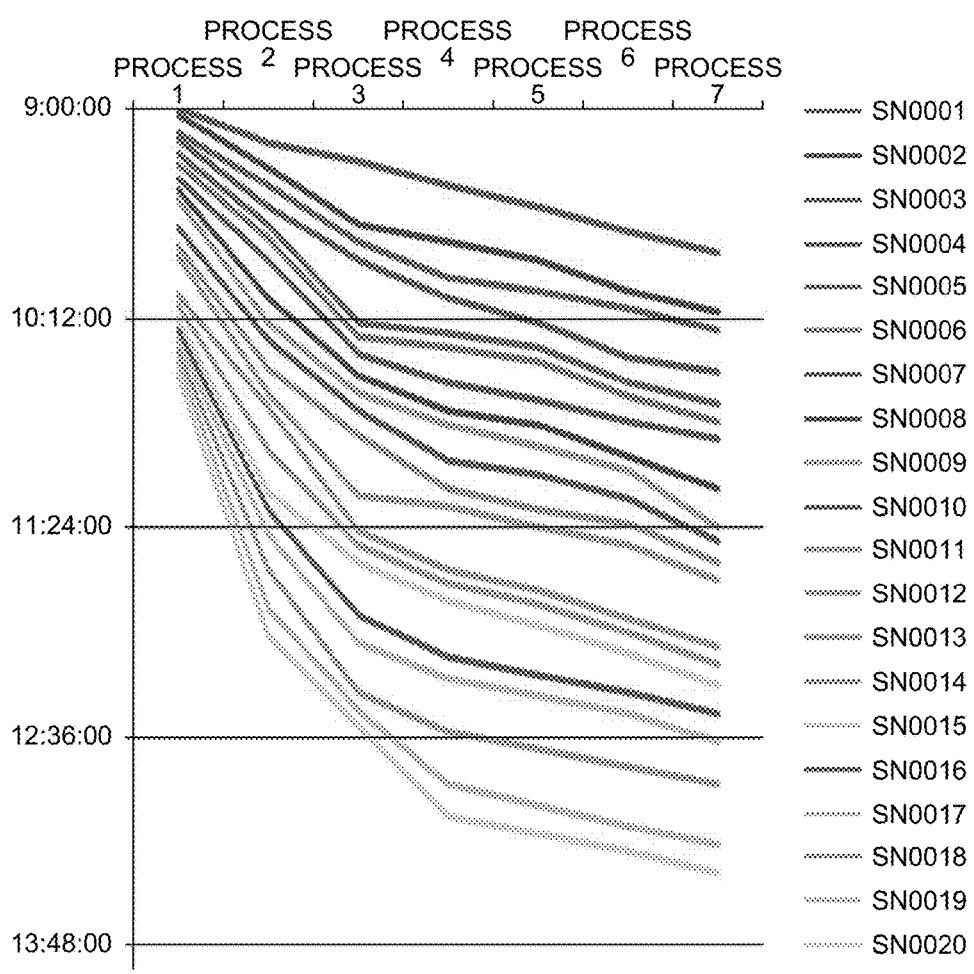
FIG. 10 is a schematic diagram for explaining an example of a graph produced by a placement unit according to the first embodiment.
Figure 11:
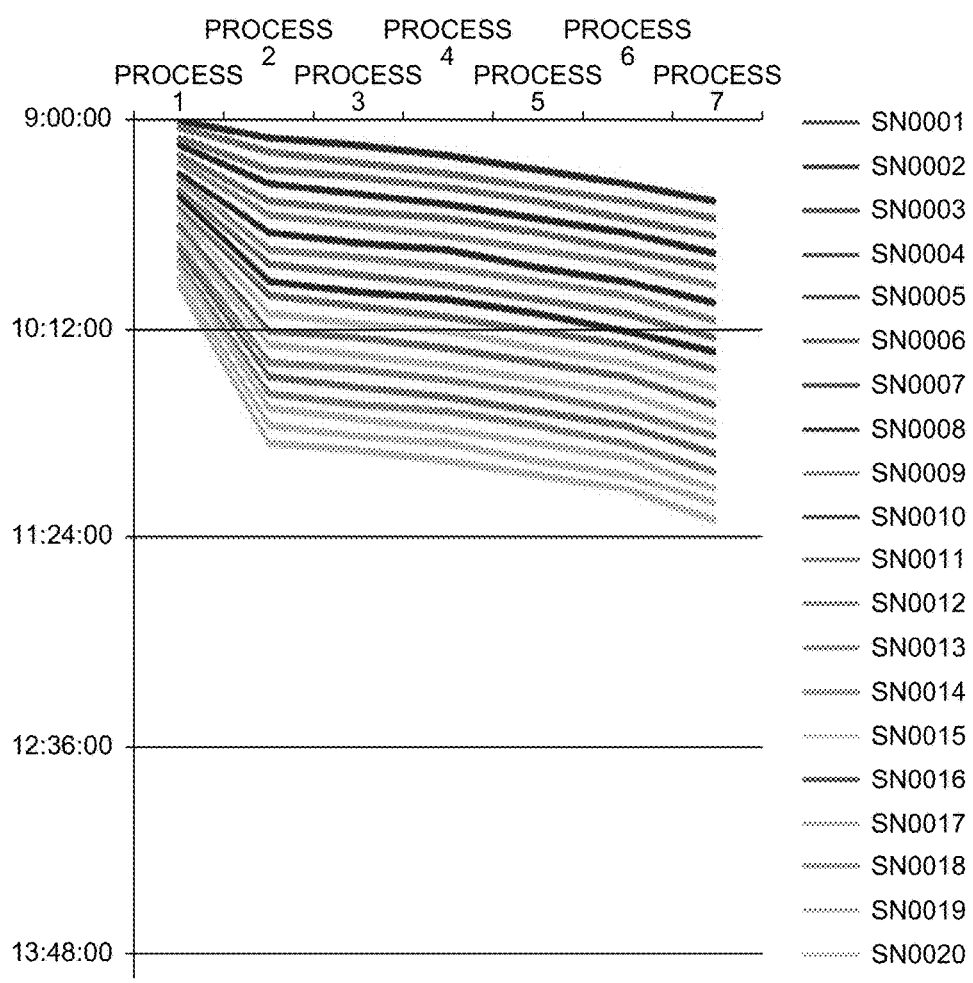
FIG. 11 is a schematic diagram for explaining an example of the graph that is related to ideal processing and produced by the placement unit according to the first embodiment.
Figure 12:
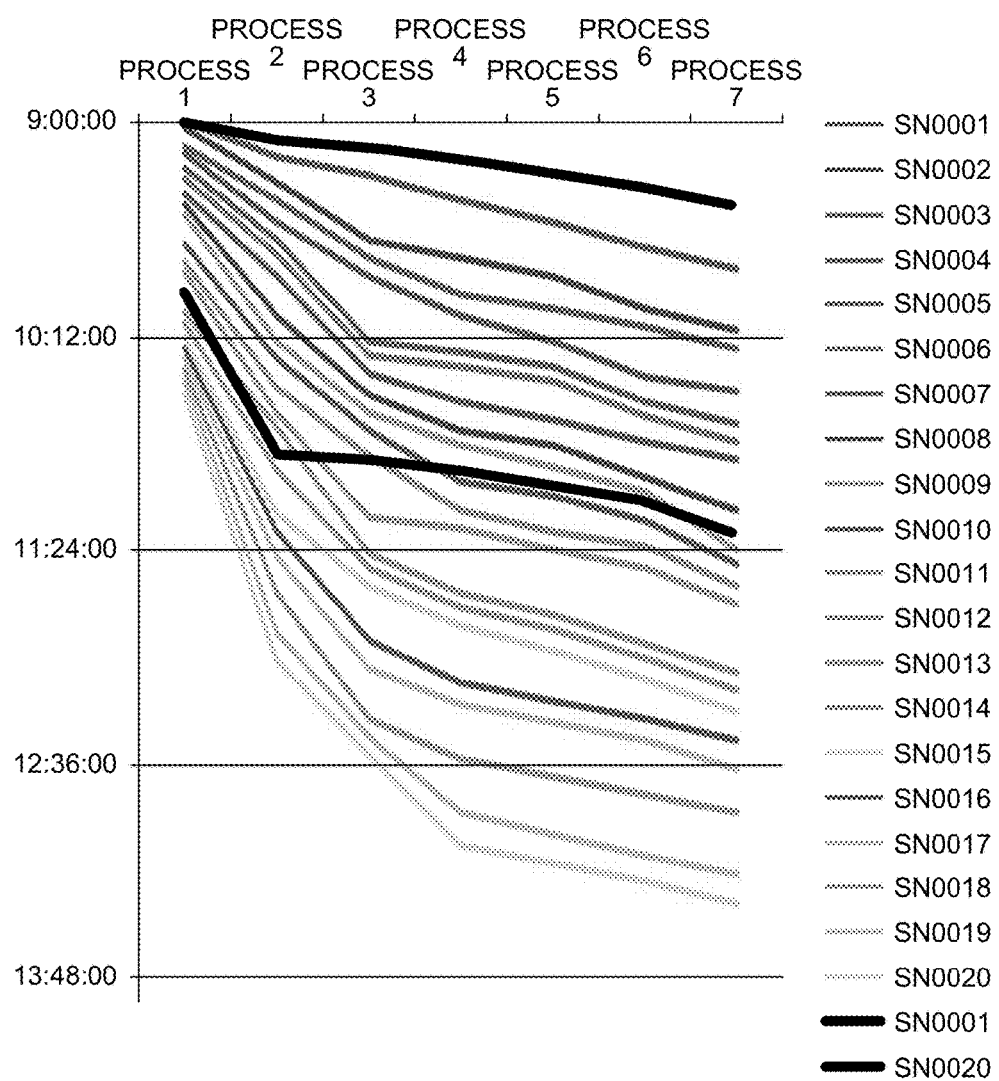
FIG. 12 is a schematic diagram for explaining an example of the graph caused to be displayed by the placement unit according to the first embodiment.

The following describes examples of the graph produced by the placement unit 113 with reference to FIGS. 10 to 12. An example of the graph that indicates the actual manufacturing status in the respective processes is described with reference to FIG. 10. FIG. 10 is a schematic diagram for explaining an example of the graph produced by the placement unit according to the first embodiment. FIG. 10 illustrates the graph in which the ending times in the process 1 to the process 7 are plotted for each product. In FIG. 10, the temporal axes indicating the ending times in the respective processes are omitted.

For example, the placement unit 113 places the ending times in the respective processes on the temporal axes of the respective processes, i.e., plots the values on the graph, such as the ending time "9:08:38" in the process 1, the ending time "9:16:32" in the process 2, and the ending time "9:24:10" in the process 3 in relation to the product number "SN0001". The placement unit 113 then places the line connecting the points plotted on the temporal axes of the respective processes in relation to the product number "SN0001". In a similar manner, in relation to the products indicated by the product numbers "SN0002" to "SN0020", the placement unit 113 plots the ending times in the respective processes on the temporal axes of the respective processes, and places the lines that connect the corresponding respective plotted points and are colored in different colors from one another. As a result, the placement unit 113 produces the graph indicating the actual manufacturing status as illustrated in FIG. 10. When the production result log DB 121 stores therein the starting times of the products in the respective processes, the placement unit 113 plots, for each of the products, the points indicating the starting times in the respective processes on the temporal axes of the respective processes, and produces the graph in which the plotted points are connected for each of the products.

With reference to FIG. 11, the following describes an example of the graph indicating the manufacturing status when all of the products are ideally processed, i.e., the graph indicating the ideal manufacturing status. FIG. 11 is a schematic diagram for explaining an example of the graph that is related to the ideal processing and is produced by the placement unit according to the first embodiment. In the example illustrated in FIG. 11, the ideal data calculated by the calculation unit 112 is plotted for all of the products. For example, the placement unit 113 acquires the ideal data calculated by the calculation unit 112. The placement unit 113 then plots the points indicating the starting times or the ending times stored in the acquired ideal data on the temporal axes of the respective processes, and produces a graph in which the plotted points are connected for each product.

As illustrated in FIG. 11, the shape of the graph, in which the points indicating the starting times or the ending times are connected for each of the products when all of the products are ideally processed, is less widened than that of the graph illustrated in FIG. 10. Specifically, in the graph when all of the products are ideally processed illustrated in FIG. 11, the intervals between the ending times or the starting times of the respective products at the process 7, which is the last process, vary less than those in the graph illustrated in FIG. 10.

When the graph illustrated in FIG. 11 is displayed by being overlapped with the graph illustrated in FIG. 10, which indicates the actual manufacturing status, it is difficult to identify a process outside the ideal manufacturing status, i.e., an abnormal process, because the number of lines included in the graph increases. The placement unit 113 thus extracts, out of the lines in the graph indicating the ideal manufacturing status, the line connecting the starting times or the ending times in the respective processes of the first product and the line connecting the starting times or the ending times in the respective processes of the last product. The placement unit 113 then displays the extracted lines on the graph indicating the actual manufacturing status illustrated in FIG. 10 such that the lines overlap with the graph.

FIG. 12 is a schematic diagram for explaining an example of the graph caused to be displayed by the placement unit according to the first embodiment. In the example illustrated in FIG. 12, the line connecting the ideal ending times in the respective processes of the first product and the line connecting the ideal ending times in the respective processes of the last product are indicated with the bolder lines than the lines of the graph indicating the actual manufacturing status. As illustrated in FIG. 12, the placement unit 113 allows the line connecting the ideal ending times in the respective processes of the first product and the line connecting the ideal ending times in the respective processes of the last product to be displayed on the graph indicating the actual manufacturing status such that the lines overlap with the graph. As a result, the placement unit 113 can display a graph allowing a user to readily visually recognize abnormalities in the manufacturing status.

For example, a user can visually recognize that the ending times of the processing in the processes 1 and 7 of the last product differ between the actual manufacturing status and the ideal manufacturing status from the graph illustrated in FIG. 12. Based on the magnitudes of the difference in the respective processes, the user can determine that the processing after the process 2 can be streamlined because the magnitude of the difference is further increased as the process proceeds from process 1 to process 3. The user can also read that the ending timing of the processing widely varies product by product compared with the ideal manufacturing status in processes 3 and 4 from the graph illustrated in FIG. 12. The user can also readily read that the process to be streamlined is present in the processes 1 to 4 because the lines connecting the ending times of the processing after the process 4 do not much differ between the ideal manufacturing status and the actual manufacturing status.

The placement unit 113 may color an area interposed between the line connecting the ideal ending times in the respective processes of the first product and the line connecting the ideal ending times in the respective processes of the last product in a certain color. Such coloring makes it possible for a user to readily visually recognize an area outside the ideal manufacturing status.

Flow of Processing Performed by Display Device According to First Embodiment

Figure 13:
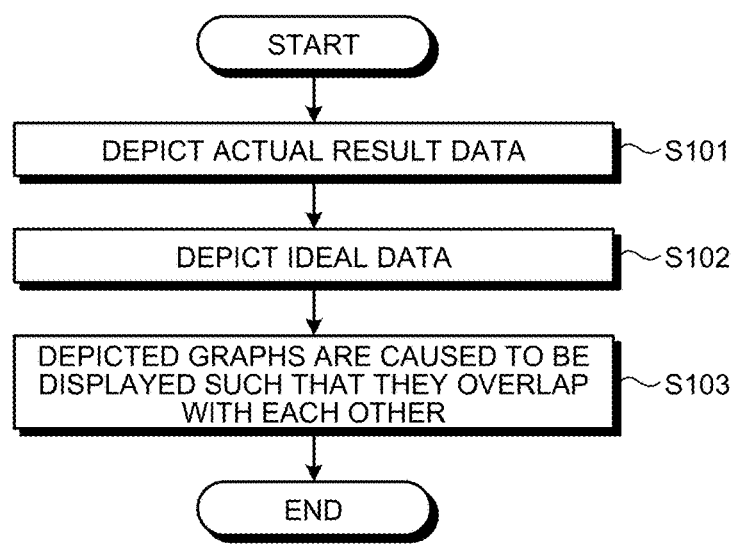
FIG. 13 is a flowchart illustrating an example of the overall processing flow of the display device according to the first embodiment.
Figure 14:
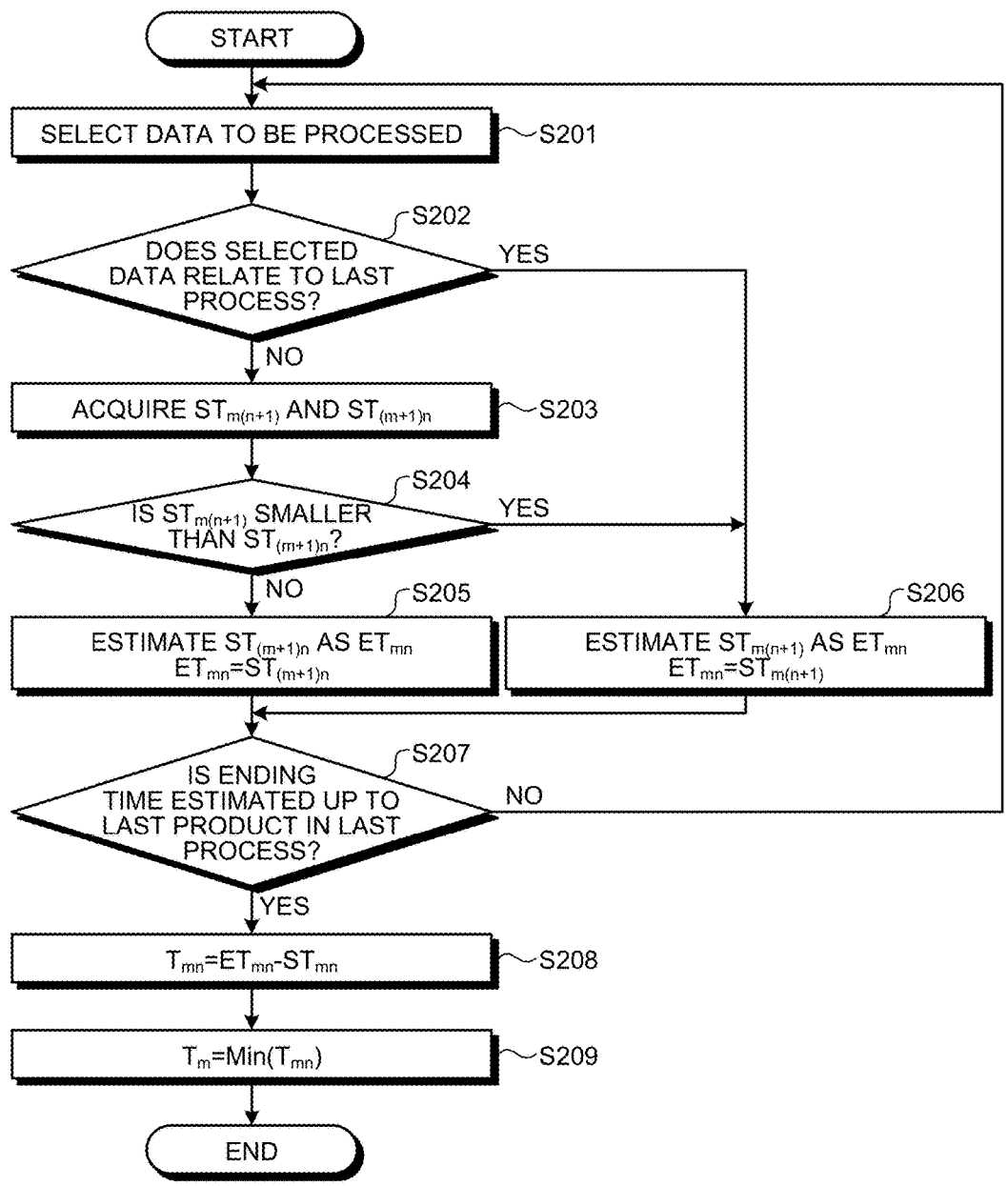
FIG. 14 is a flowchart for explaining an example of a flow of the processing performed by the display device according to the first embodiment to calculate the ending times from starting times.
Figure 15:
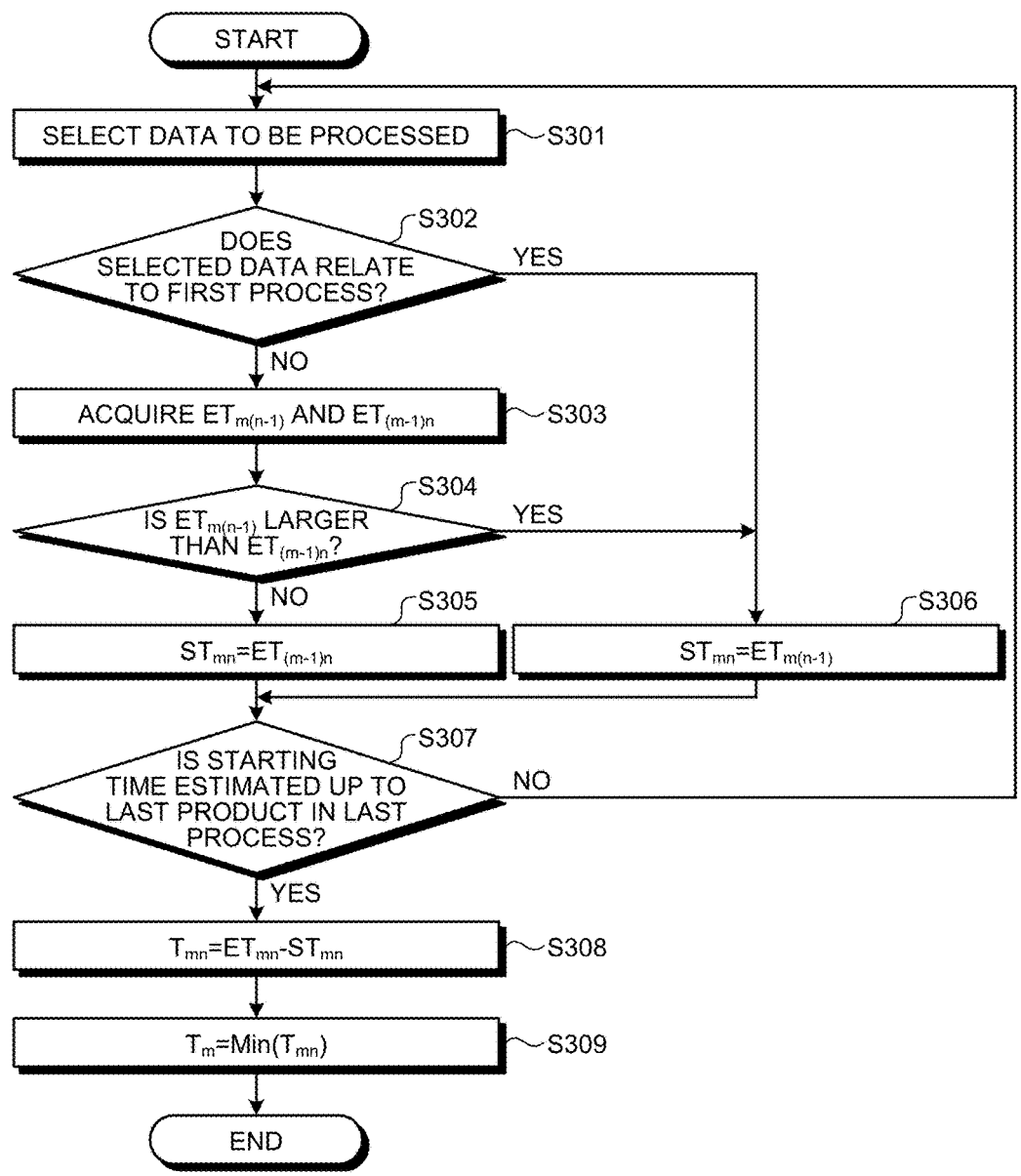
FIG. 15 is a flowchart for explaining an example of a flow of the processing performed by the display device according to the first embodiment to calculate the starting times from the ending times.

The following describes a flow of the processing performed by the display device 100 with reference to FIGS. 13 to 15. With reference to FIG. 13, the flow of the overall processing performed by the display device 100 is described. FIG. 13 is a flowchart illustrating an example of the overall processing flow of the display device according to the first embodiment. The display device 100 depicts the actual result data (step S101). Specifically, the display device 100 plots, for each product, the points indicating the starting times or the ending times stored in the production result log DE 121 and produces a graph in which the plotted points are connected for each product. The display device 100 depicts the ideal data (step S102). Specifically, the display device 100 plots the points indicating the ideal starting times or the ideal ending times of the first manufactured product and the last manufactured product, and produces a graph in which the plotted points are connected for each of the two products. The display device 100 displays the graphs depicted at steps S101 and S102 such that they overlap with each other (step S103), and thereafter ends the processing.

With reference to FIG. 14, the following describes a flow of the processing performed by the calculation unit 112 of the display device 100 to calculate the ending times from the starting times stored in the production result log DB 121. FIG. 14 is a flowchart for explaining an example of the processing performed by the display device according to the first embodiment to estimate the ending times from the starting times. The calculation unit 112 selects, from the starting times stored in the production result log DB 121, a starting time $ST_{mn}$ of the product to be processed (step S201). In the starting time $ST_{mn}$, m is the number indicating the process related to the selected starting time. In the starting time $ST_{mn}$, n is the number indicating the product related to the selected starting time. For example, the calculation unit 112 selects the starting time "9:16:42" in the process 2 associated with the product number "SN0002".

The calculation unit 112 determines whether the selected starting time relates to the last process (step S202). If the selected starting time does not relate to the last process (No at step S202), the calculation unit 112 performs the following processing. The calculation unit 112 acquires a starting time $ST_{m(n+1)}$ of the product next processed in the process related to the selected starting time and a starting time $ST_{(m+1)n}$ of the product related to the selected starting time in the next process (step S203).

The calculation unit 112 determines whether $ST_{m(n+1)}$ is smaller than $ST_{(m+1)n}$ (step S204). If $ST_{m(n+1)}$ is not smaller than $ST_{(m+1)n}$ (No at step S204), the calculation unit 112 estimates $ST_{(m+1)n}$ as an ending time $ET_{mn}$ (step S205). If $ST_{m(n+1)}$ is smaller than $ST_{(m+1)n}$ (Yes at step S204), the calculation unit 112 estimates $ST_{m(n+1)}$ as the ending time $ET_{mn}$ (step S206).

The calculation unit 112 determines whether the ending time is estimated up to the last process of the last product (step S207). If the ending time is estimated up to the last process of the last product (Yes at step S207), the calculation unit 112 calculates a production period $T_{mn}$ of each process of each product (step S208). For example, the calculation unit 112 calculates $T_{mn}$ ($=ET_{mn}-ST_{mn}$) for all m and n. The calculation unit 112 determines $T_{mn}$ having the minimum value out of all calculated $T_{mn}$ as an ideal period $T_m$ of the process m (step S209), and thereafter ends the processing.

If the ending time is not estimated up to the last process of the last product (No at step S207), the calculation unit 112 performs the processing at step S201. If the selected starting time relates to the last process (Yes at step S202), the calculation unit 112 performs the processing at step S206. This case causes the processing to automatically proceed to that at step S206 because no process follows after the last process.

With reference to FIG. 15, the following describes a flow of the processing performed by the calculation unit 112 to calculate the starting times from the ending times stored in the production result log DB 121. FIG. 15 is a flowchart for explaining an example of the processing performed by the display device according to the first embodiment to calculate the starting times from the ending times. The processing at steps S301 and S307 to S309 in FIG. 15 is the same as that at step S201 and S207 to S209 in FIG. 14, and description thereof is thus omitted.

The calculation unit 112 determines whether the selected ending time relates to the first process (step S302). If the selected ending time relates to the first process (Yes at step S302), the calculation unit 112 performs the processing at step S306. This case causes the processing to automatically proceed to that at step S306 because no process is present before the first process. If the selected ending time does not relate to the first process (No at step S302), the calculation unit 112 performs the following processing.

The calculation unit 112 acquires an ending time $ET_{m(n-1)}$ of the product processed just before in the process related to the selected ending time $ET_{mn}$ and an ending time $ET_{(m-1)n}$ of the product related to the selected ending time in the process performed just before (step S303). For example, when selecting the ending time "9:32:05" in the process 2 associated with the product number "SN0002", the calculation unit 112 determines the ending time "9:16:32" in the process 2 associated with the product number "SN0001" as $ET_{m(n-1)}$. The calculation unit 112 also determines the ending time "9:19:34" in the process 1 associated with the product number "SN0002" as $ET_{(m-1)n}$.

The calculation unit 112 determines whether $ET_{m(n-1)}$ is larger than $ET_{(m-1)n}$ (step S304). If $ET_{m(n-1)}$ is not larger than $ET_{(m-1)n}$ (No at step S304), the calculation unit 112 determines $ET_{(m-1)n}$ as a starting time $ST_{mn}$ (step S305). If $ET_{m(n-1)}$ is larger than $ET_{(m-1)n}$ (Yes at step S304), the calculation unit 112 determines $ET_{m(n-1)}$ as the starting time $ST_{mn}$ (Step S306).

Figure 16:
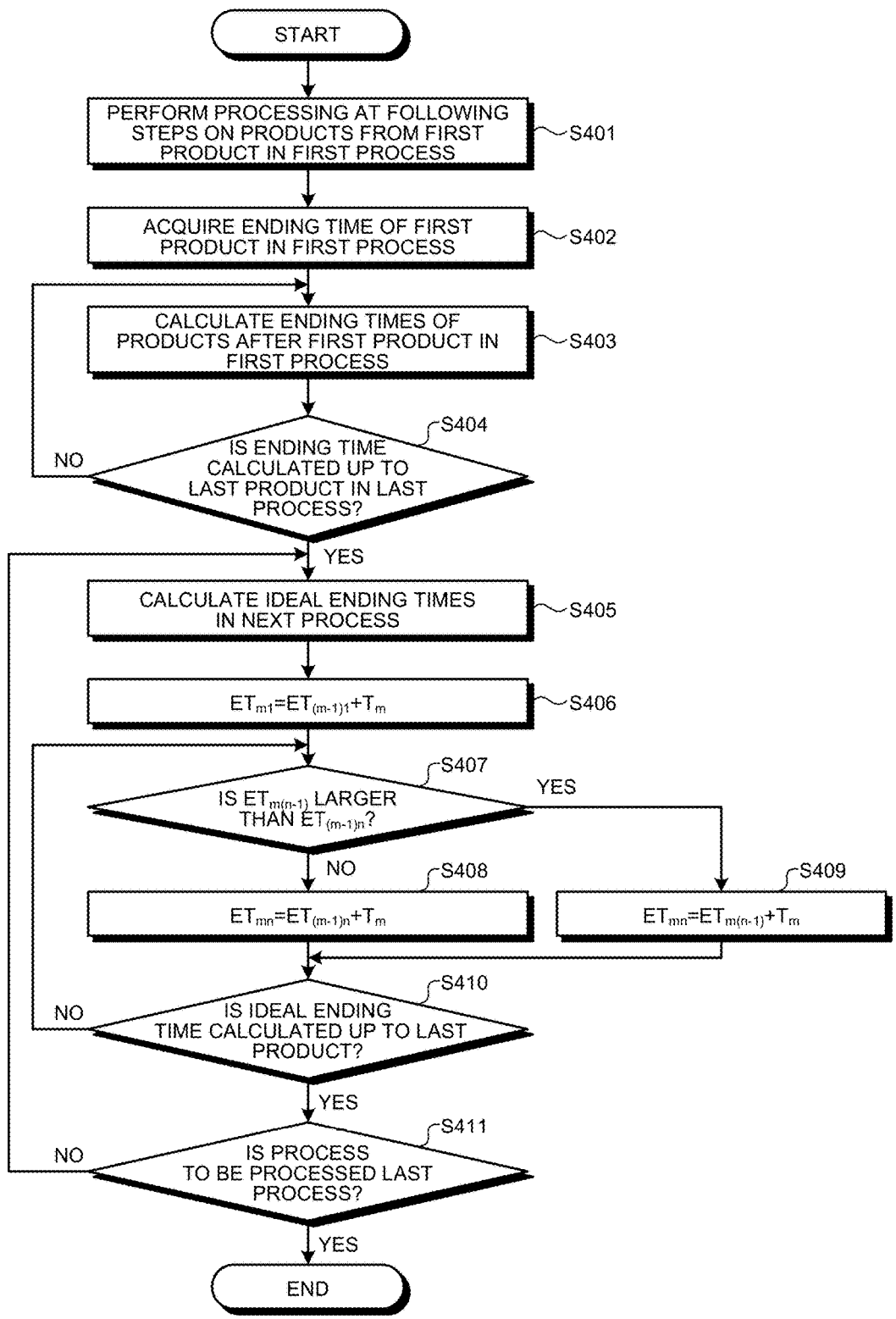
FIG. 16 is a flowchart for explaining an example of a flow of the processing performed by the display device according to the first embodiment to produce the ideal data.

With reference to FIG. 16, the following describes a flow of the processing performed by the calculation unit 112 to produce the ideal data. FIG. 16 is a flowchart for explaining an example of a flow of the processing performed by the display device according to the first embodiment to produce the ideal data. In the example illustrated in FIG. 16, the ideal ending times of the products in the respective processes are calculated as the ideal data. The calculation unit 112 can calculate the ideal starting times of the products in the respective processes as the ideal data by performing the processing illustrated in FIG. 16 in a similar manner.

The calculation unit 112 performs the processing at steps S402 to S411 on the respective products from the first product in the first process (step S401). The calculation unit 112 acquires the ending time of the first product in the first process (step S402). The calculation unit 112 calculates the ending times of the products following the first product in the first process (step S403). For example, the calculation unit 112 adds the ideal period of the first process to the ending time of the first product in the first process and determines the resulting value as the ending time of the product next to the first product. The calculation unit 112 determines whether the ending time is calculated up to the last product in the first process (step S404). If the ending time is not calculated up to the last product in the first process (No at step S404), the calculation unit 112 repeats the processing at step S403 to calculate the ending time up to the last product in the first process.

If the ending time is calculated up to the last product in the first process (Yes at step S404), the calculation unit 112 performs the processing at steps S405 to S411, and thereafter calculates the ideal ending times of the respective products in the next process (step S405). The calculation unit 112 adds an ideal period $T_m$ to the ending time $ET_{(m-1)1}$ of the first product in the process (m−1) and determines the resulting value as the ending time $ET_{11}$ of the first product in the process (m−1) when the process to be processed is the process m (step S406). The calculation unit 112 determines whether $ET_{m(n-1)}$ is larger than $ET_{(m-1)n}$ when calculating the ending time of the product n (step S407). If $ET_{m(n-1)}$ is not larger than $ET_{(m-1)n}$ (No at step S407), the calculation unit 112 determines the sum of $Et_{(m-1)n}$ and $T_m$ as the ideal ending time $ET_{mn}$ (step S408). If $Et_{m(n-1)}$ is larger than $ET_{(m-1)n}$ (Yes at step S407), the calculation unit 112 determines the sum of $Et_{m(n-1)}$ and $T_m$ as the ideal ending time $ET_{mn}$ (step S409).

The calculation unit 112 determines whether the ideal ending time is calculated up to the last product (step S410). If the ideal ending time is not calculated up to the last product (No at step S410), the calculation unit 112 performs the processing at step S407 on the next product. If the ideal ending time is calculated up to the last product (Yes at step S410), the calculation unit 112 determines whether the process to be processed is the last process (step S411). If the process to be processed is not the last process (No at step S411), the calculation unit 112 performs the processing at step S405. If the process to be processed is the last process (Yes at step S411), the calculation unit 112 ends the processing.

Advantageous Effects of Display Device of First Embodiment

As described above, the display device 100 visualizes the manufacturing status of the products each manufactured by the processing performed sequentially by the plurality of apparatuses included in the manufacturing line. Specifically, the display device 100 identifies, for each product, the starting times or the ending times in the respective processes based on the production result log DB 121. The display device 100 places the starting times or the ending times in the respective processes of each product on the temporal axes indicating the starting times or the ending times of the products in the respective processes. Thereafter, the display device 100 places, for each product, the line connecting the points placed on the respective temporal axes. As a result, the display device 100 produces the graph indicating the actual manufacturing status.

The display device 100 places, on the respective temporal axes, the points indicating the starting times or the ending times in the respective processes when the product first manufactured in the manufacturing line is normally processed in the respective processes, and then places the line connecting the placed points. The display device 100 places, on the respective temporal axes, the points indicating the starting times or the ending times in the respective processes of the last manufactured product when all of the products are normally processed, and then places the line connecting the placed points. The display device 100 thus places, on the graph indicating the actual manufacturing status, the lines indicating the ideal starting times or the ideal ending times of the first and the last products when all of the products are ideally processed. As a result, the display device 100 can display the graph that allows a user to readily visually recognize abnormalities in the manufacturing status. The display device 100 displaying the graph makes it possible to allow a user who visually recognizes the graph to recognize a degree of the abnormalities in the manufacturing status with a temporal point of view at a glance.

The display device 100 calculates, for each product, the production periods, each of which is the period in which the processing is performed in the process, in the respective processes using the production result log DB 121. The display device 100 identifies, for each process, the shortest production period out of the calculated production periods as the ideal period. The calculation unit 112 calculates the ideal starting times or the ideal ending times when all of the products are ideally processed using the ideal periods identified for the respective processes. The display device 100 thus can calculate the ideal starting times or the ideal ending times even when the production result log DB 121 stores therein only either the starting times or the ending times. As a result, the display device 100 can display the graph indicating the ideal manufacturing status such that the graph overlaps with the graph indicating the actual manufacturing status.

When the production result log DB 121 stores therein only the starting times, the display device 100 performs the following processing for each product. The display device 100 compares the starting time of the product indicated by the product number "SN0002" in the process 3 with the starting time of the product indicated by the product number "SN0003" in the process 2, and identifies the earlier starting time. The display device 100, then, identifies the production period of the product indicated by the product number "SN0002" in the process 2 using the identified starting time as the ending time of the product indicated by the product number "SN0002" in the process 2. The display device 100 performs the processing described above on all of the products. The display device 100 calculates the ideal staring times of the respective products in each process using the shortest production period out of the production periods identified for each process as the ideal period. As a result, the display device 100 can calculate the ideal starting times even when the production result log DB 121 stores therein only the ending times.

When the production result log DB 121 stores therein only the ending times, the display device 100 performs the following processing for each product. The display device 100 compares the ending time of the product indicated by the product number "SN0002" in the process 1 with the ending time of the product indicated by the product number "SN0001" in the process 2, and identifies the later ending time. The display device 100, then, identifies the production period of the product indicated by the product number "SN0002" in the process 2 using the identified ending time as the starting time of the product indicated by the product number "SN0002" in the process 2. The display device 100 performs the processing described above on all of the products. The display device 100 calculates the ideal ending times of the respective products in each process using the shortest production period out of the production periods identified for each process. As a result, the display device 100 can calculate the ideal ending times even when the production result log DB 121 stores therein only the starting times.

[b] Second Embodiment

Functional Structure of Display Device

Figure 17:
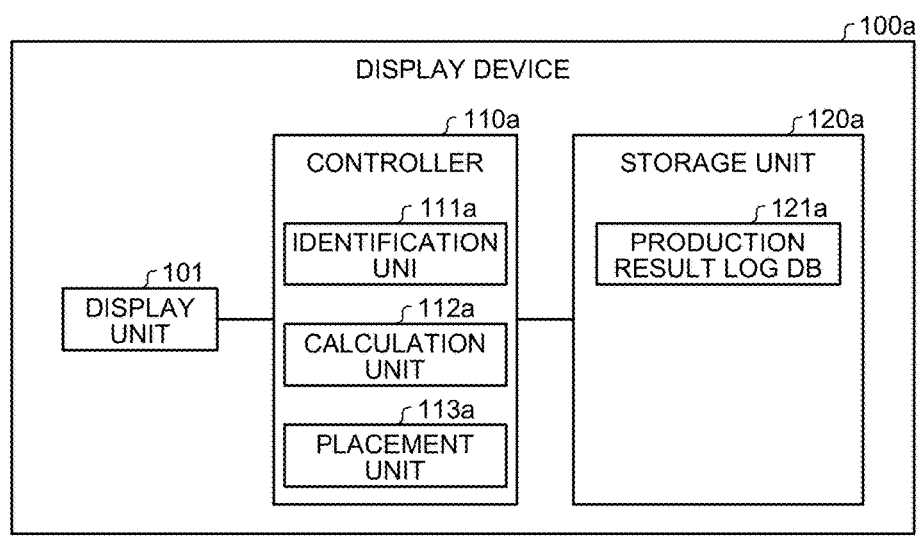
FIG. 17 is a functional block diagram illustrating a structure of a display device according to a second embodiment.

The following describes an example of a functional structure of a display device 100a according to a second embodiment. FIG. 17 is a functional block diagram illustrating the structure of the display device according to the second embodiment. As illustrated in FIG. 17, the display device 100a includes a display unit 101, a controller 110a, and a storage unit 120a. The controller 110 includes an identification unit 111a, a calculation unit 112a, and a placement unit 113a. The storage unit 120a stores therein a production result log DB 121a. The storage unit 120a is a semiconductor memory element such as a RAM, a ROM, or a flash memory, or a storage device such as a hard disk drive or an optical disc drive.

Structure of Storage Unit

The production result log DB 121a stores therein the logs of the processing performed by the manufacturing apparatuses included in the manufacturing line. The production result log DB 121a stores therein the logs indicating the starting times and the ending times of the processing in the respective processes for each product.

FIG. 18 is a schematic diagram illustrating an example of a data structure of the production result log DB according to the second embodiment. In the example illustrated in FIG. 18, the production result log DB 121a stores therein the product numbers, the starting times of the processing in the respective processes, and the ending times of the processing in the respective processes in association with one another.

For example, a first record of the production result log DB 121a indicates the starting time "9:00:00" and the ending time "9:02:05" in the process 1 and the starting time "9:02:16" and the ending time "9:06:05" in the process 2 of the product indicated by the product number "SN0001". The first record of the production result log DB 121a also indicates the starting time "9:06:17" and the ending time "9:10:19" in the process 3 of the product indicated by the product number "SN0001". For another example, a second record of the production result log DB 121a indicates the starting time "9:03:36" and the ending time "9:05:50" in the process 1 and the starting time "9:08:00" and the ending time "9:11:46" in the process 2 of the product indicated by the product number "SN0002". The first record of the production result log DB 121a also indicates the starting time "9:11:56" and the ending time "9:16:24" in the process 3 of the product indicated by the product number "SN0002".

The production result log DB 121a stores therein the starting times and the ending times of the other products in the respective processes as the other records. In the example of FIG. 18, the starting times and the ending times in the processes 1 to 3 are presented for the products indicated by the product number "SN0001" to a product number "SN0005". The production result log DB 121a further stores therein the starting times and the ending times in the processes 4 to 7 of the products. The production result log DB 121a further stores therein the starting times and the ending times in the processes 1 to 7 of the products indicated by the product numbers "SN0006" to "SN0020". In the example illustrated in FIG. 18, the data about the respective items are stored in association with one another as the records. The data may be stored in a different manner from that illustrated in FIG. 18 as long as the relation is maintained as described above among the items associated with one another.

Structure of Controller

The controller 110a performs control for the processing that visualizes the manufacturing status of the products, each of which is manufactured through processing sequentially performed by the manufacturing apparatuses included in the manufacturing line. The functions of the identification unit 111a, the calculation unit 112a, and the placement unit 113a included in the controller 110a can be achieved by a CPU that executes a certain program, for example. The functions of the controller 110a can be achieved by an integrated circuit such as an ASIC or an FPGA.

Structure of Identification Unit

The identification unit 111a identifies, for each product, the starting times and the ending times in the respective processes based on the information stored in the production result log DB 121a. When identifying the ending times in the respective processes of the product indicated by the product number "SN0001", for example, the identification unit 111a performs the following processing. The identification unit 111a identifies the starting time "9:00:00" and the ending time "9:02:05" in the process 1, the starting time "9:02:16" and the ending time "9:06:05" in the process 2, and the starting time "9:06:17" and the ending time "9:10:19" in the process 3, which processes are associated with the product number "SN0001".

Structure of Calculation Unit

The calculation unit 112a calculates, for each process, the ideal period in which processing is ideally performed, an ideal preparation period, and an ideal transferring period using the production result log DB 121a. The ideal preparation period indicates an ideal time for preparation to start the next processing after the completion of the processing in a certain process. The ideal transferring period indicates an ideal time for transferring the product between the manufacturing apparatuses from the completion of the processing in the previous process to the start of the processing in a certain process. The calculation unit 112a calculates, for each product, the ideal starting times and the ideal ending times in the respective processes using the ideal periods, the ideal preparation periods, and the ideal transferring periods.

A time period for manufacturing a certain product includes the production period in which the processing is performed on the product in a certain process, the preparation period from the completion of the processing of the product to the start of the processing of the next product in the process, and the transferring period for transferring the processed product to the next manufacturing apparatus. The ideal preparation period and the ideal transferring period differ from manufacturing apparatus to manufacturing apparatus in a similar manner as the ideal period. The calculation unit 112a calculates the ideal preparation periods and the ideal transferring periods by performing similar processing as the calculation of the ideal periods.

Specifically, the calculation unit 112a calculates a difference between the starting time and the ending time in each process of each product as the production period using the production result log DB 121a. The calculation unit 112a identifies, for each process, the shortest production period out of the calculated production periods as the ideal period. The calculation unit 112a calculates, for each process, a difference between the ending time of the process and the starting time of the next process as the transferring period using the production result log DB 121a. The calculation unit 112a identifies, for each process, the shortest transferring period out of the calculated transferring periods as the ideal transferring period.

FIG. 19 is a schematic diagram illustrating an example of the production periods and the transferring periods that are calculated by the calculation unit according to the second embodiment. The calculation unit 112a calculates the production periods and the transferring periods illustrated in FIG. 19 using the production result log DB 121a illustrated in FIG. 18. For example, the calculation unit 112a calculates the difference "0:02:05" between the starting time "9:00:00" and the ending time "9:02:05" in the process 1 associated with the product number "SN0001" as the production period in the process 1. The calculation unit 112a calculates the difference "0:00:11" between the ending time "9:02:05" in the process 1 and the starting time "9:02:16" in the process 2, which processes are associated with the product number "SN0001", as the transferring period in the process 1. The calculation unit 112a calculates the production periods and the transferring periods in the other processes associated with the product number "SN0001". The calculation unit 112a also calculates the production periods and the transferring periods of the respective processes of the products having other products numbers.

The calculation unit 112a identifies, for each process, the shortest production period out of the production periods calculated for the respective products as the ideal period. The calculation unit 112a identifies, for each process, the shortest transferring period out of the transferring periods calculated for the respective products as the ideal transferring period. In the example illustrated in FIG. 19, the calculation unit 112a identifies "0:02:00" as the ideal period of the process 1, "0:00:11" as the ideal transferring period of the process 1, "0:03:31" as the ideal period of the process 2, and "0:00:10" as the ideal transferring period of the process 2, for example. The calculation unit 112a also identifies "0:04:02" as the ideal period of the process 3, and "0:00:10" as the ideal transferring period of the process 3.

The calculation unit 112a calculates, as the preparation period, a difference between the ending time when the processing on a certain product ends and the starting time when the processing on the next product starts using the production result log DB 121a. The calculation unit 112a identifies, for each process, the shortest preparation period out of the calculated preparation periods as the ideal preparation period. FIG. 20 is a schematic diagram illustrating an example of the preparation periods calculated by the calculation unit according to the second embodiment. The calculation unit 112a calculates the preparation periods illustrated in FIG. 20 using the production result log DB 121a illustrated in FIG. 18.

For example, the calculation unit 112a calculates the difference "0:01:32" between the ending time "9:02:05" in the process 1 associated with the product number "SN0001" and the starting time "9:03:36" in the process 1 associated with the product number "SN0002" as the preparation period in the process 1 associated with the product number "SN0002". The calculation unit 112a calculates the difference "0:01:55" between the ending time "9:06:05" in the process 2 associated with the product number "SN0001" and the starting time "9:08:00" in the process 2 associated with the product number "SN0002" as the preparation period in the process 2 associated with the product number "SN0002". The calculation unit 112a calculates the difference "0:01:37" between the ending time "9:10:19" in the process 3 associated with the product number "SN0001" and the starting time "9:11:56" in the process 3 associated with the product number "SN0002" as the preparation period in the process 3 associated with the product number "SN0002". The calculation unit 112a calculates the preparation periods in the other processes associated with the product number "SN0002", and the preparation periods in the respective processes of the products having other product numbers.

The calculation unit 112a identifies, for each process, the shortest preparation period out of the calculated preparation periods as the ideal preparation period. In the example illustrated in FIG. 20, the calculation unit 112 identifies the ideal preparation period "0:00:20" of the process 1, the ideal preparation period "0:00:43" of the process 2, and the ideal preparation period "0:00:22" of the process 3, for example.

The calculation unit 112a calculates, as the ideal data, the starting times and the ending times when the respective products are ideally processed in each process using the ideal period, the ideal preparation period, and the ideal transferring period that are calculated for each process. Specifically, the calculation unit 112a calculates the ideal starting times and the ideal ending times in the respective processes for each product. For example, the calculation unit 112a acquires the starting time "9:00:00" in the process 1 associated with the product number "SN0001" from the production result log DB 121a. The calculation unit 112a then calculates the ideal ending time in the process 1 associated with the product number "SN0001" by adding the ideal period to the acquired starting time. The calculation unit 112a then calculates the ideal starting time in the process 1 associated with the product number "SN0002" by adding the ideal preparation period to the calculated ideal ending time. The calculation unit 112a sequentially calculates the ideal ending times by adding the ideal period to the ideal starting times of the respective products in the process 1 while the calculation unit 112a sequentially calculates the ideal starting times of the respective products by adding the ideal preparation period to the ideal ending times of the respective products in the process 1.

When calculating the ideal starting times and the ideal ending times of all of the products in the process 1, the calculation unit 112a performs the following processing on the process 2. The calculation unit 112a adds the ideal transferring time to the ideal ending time of the product indicated by the product number "SN0001" in the process 1 and determines the resulting value as the ideal starting time of the product in the process 2. The calculation unit 112 adds the ideal period of the process 2 to the ideal starting time of the product indicated by the product number "SN0001" in the process 2 and determines the resulting value as the ideal ending time of the product indicated by the product number "SN0001" in the process 2.

When calculating the ideal starting time of the product indicated by the product number "SN0002" in the process 2, the calculation unit 112a performs the following processing. The calculation unit 112a compares the time obtained by adding the ideal preparation period to the ideal ending time of the product indicated by the product number "SN0001" in the process 2 with the time obtained by adding the ideal transferring period to the ideal ending time of the product indicated by the product number "SN0002" in the process 1. When the time obtained by adding the ideal transferring period to the ideal ending time of the product indicated by the product number "SN0002" in the process 1 is later than the other time, the calculation unit 112a determines the later time as the ideal starting time of the product indicated by the product number "SN0002" in the process 2. When the ideal ending time of the product indicated by the product number "SN0001" in the process 2 is later than the other time, the calculation unit 112a determines the later time as the ideal starting time of the product indicated by the product number "SN0002" in the process 2. The calculation unit 112a calculates the ideal ending time of the product indicated by the product number "SN0002" in the process 2 by adding the ideal period of the process 2 to the calculated ideal starting time.

The calculation unit 112a performs the processing described above on all of the products. When performing the processing described above on the all of the products in the process 2, the calculation unit 112a performs the processing on the processes 3 to 7 in the same manner, thereby producing the ideal data including the ideal starting times and the ideal ending times of all of the products in the respective processes.

FIG. 21 is a schematic diagram illustrating an example of the ideal data calculated by the calculation unit according to the second embodiment. In the example illustrated in FIG. 21, "-S" is added to the product number associated with the ideal starting times while "-E" is added to the product number associated with the ideal ending times. In the example illustrated in FIG. 21, the calculation unit 112a calculates, in relation to the product indicated by the product number "SN0001", the ideal starting time "9:00:00" in the process 1, the ideal starting time "9:02:11" in the process 2, and the ideal starting time "9:05:52" in the process 3. In the example illustrated in FIG. 21, the calculation unit 112a calculates, in relation to the product indicated by the product number "SN0001", the ideal ending time "9:02:00" in the process 1, the ideal ending time "9:05:42" in the process 2, and the ideal ending time "9:09:52" in the process 3. The calculation unit 112a calculates the ideal starting times and the ideal ending times in the other processes in relation to the product indicated by the product number "SN0001". The calculation unit 112a calculates the ideal starting times and the ideal ending times of the products indicated by other product numbers in the respective processes.

Structure of Placement Unit

Referring back to FIG. 17, the placement unit 113a causes the display unit 101 to display a graph in which the graph indicating the ideal manufacturing status overlaps with the graph indicating the actual manufacturing status by performing processing in a similar manner as the placement unit 113 illustrated in FIG. 1. For example, the placement unit 113a performs the following processing for each product using the starting times and the ending times in the respective processes identified by the identification unit 111a. The placement unit 113a places, for each process, a symbol indicating the starting time to the ending time with a length corresponding to the period from the starting time to the ending time on the temporal axis. The placement unit 113a places, for each product, a band connecting the symbols placed on the respective temporal axes. The placement unit 113a produces a graph in which the bands placed for the respective products are colored in certain different colors. The placement unit 113a thus produces a graph in which stripes indicating areas in which the processing and the transferring of the products are performed and stripes indicating areas in which no processing and transferring of the products are performed, such as stand-by, are formed as the graph indicating the actual manufacturing status.

The placement unit 113a produces a graph indicating the ideal manufacturing status using the ideal data calculated by the calculation unit 112a in a similar manner as the production of the graph indicating the actual manufacturing status. For example, the placement unit 113a places a line connecting the ideal starting times and a line connecting the ideal ending times in the respective processes of the first product in the ideal manufacturing status. The placement unit 113a places a line connecting the ideal starting times and a line connecting the ideal ending times in the respective processes of the last product in the ideal manufacturing status. The placement unit 113a produces a graph in which the areas each interposed between the two placed lines are colored in certain colors as the graph indicating the ideal manufacturing status.

Figure 22:
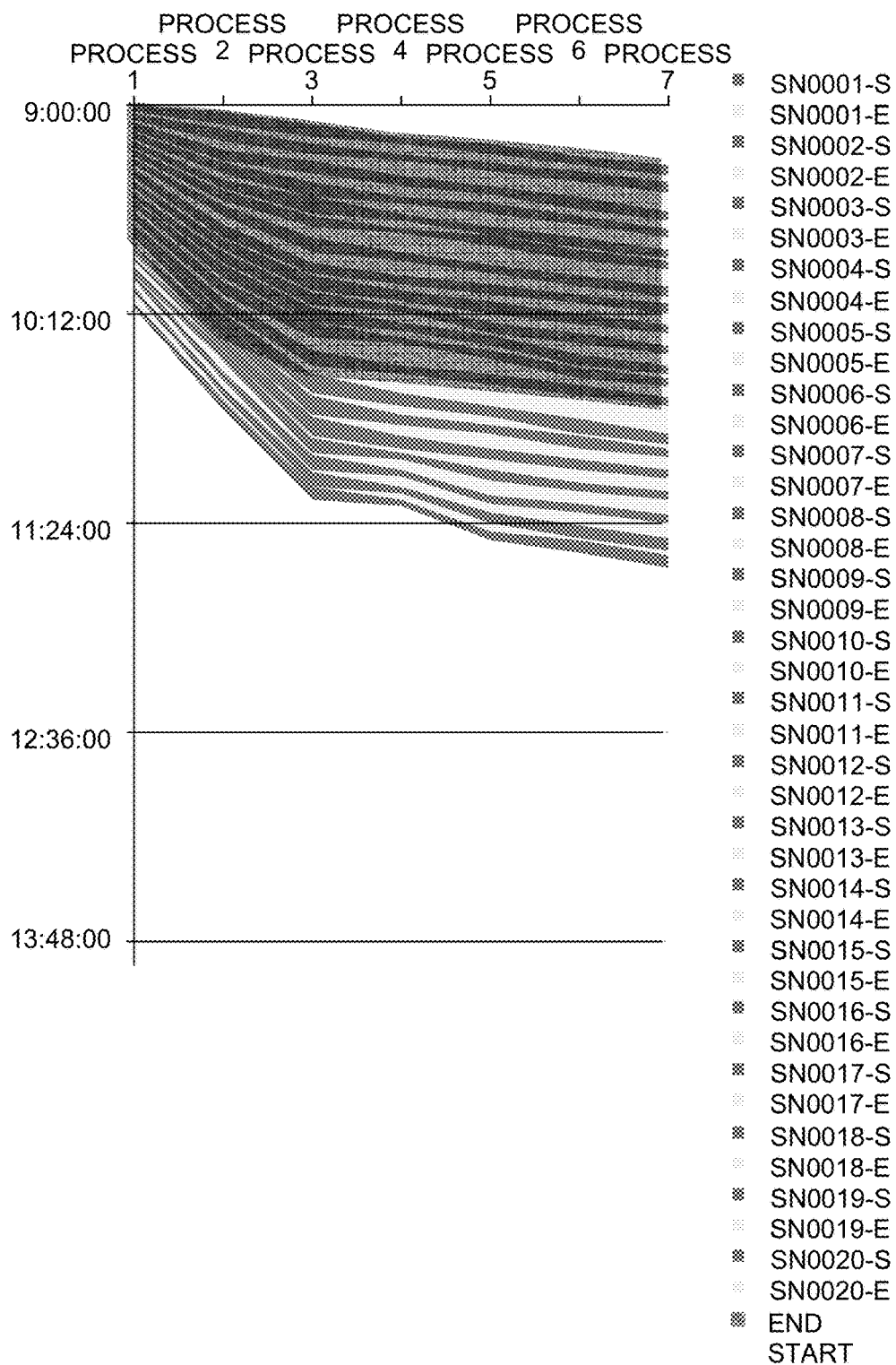
FIG. 22 is a schematic diagram for explaining an example of the graph caused to be displayed by a placement unit according to the second embodiment.

The placement unit 113a then produces a graph in which the graph indicating the ideal manufacturing status overlaps with the graph indicating the actual manufacturing status, and causes the display unit 101 to display the produced graph. FIG. 22 is a schematic diagram for explaining an example of the graph caused to be displayed by the placement unit according to the second embodiment. As illustrated in FIG. 22, the placement unit 113a produces the graph in which the stripes indicating areas in which the processing and the transferring of the products are performed and the stripes indicating areas in which no processing and transferring of the products are performed are formed as the graph indicating the actual manufacturing status. The placement unit 113a causes the graph indicating the ideal manufacturing status to be displayed in a transparent manner such that the graph overlaps with the graph indicating the actual manufacturing status.

As a result, the placement unit 113a can display a graph allowing a user to readily visually recognize abnormalities in the manufacturing status. For example, a user can readily visually recognize that the areas in which no processing and transferring is performed on the products are larger in the processes after the process 3 than those in the ideal manufacturing status. The user thus can identify a room for improvement in the processes after the process 3.

Flow of Processing Performed by Display Device According to Second Embodiment

Figure 23:
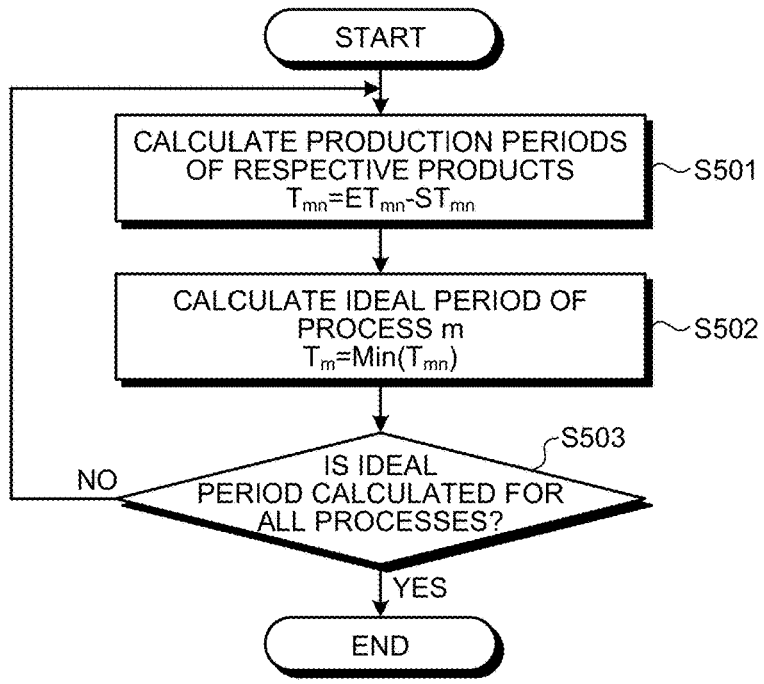
FIG. 23 is a flowchart for explaining an example of a flow of the processing performed by the display device according to the second embodiment to calculate ideal periods.

The following describes a flow of the processing performed by the display device 100a with reference to FIGS. 23 to 26. With reference to FIG. 23, the following describes a flow of the processing performed by the calculation unit 112a of the display device 100a to calculate the ideal periods. FIG. 23 is a flowchart for explaining an example of the flow of the processing performed by the display device according to the second embodiment to calculate the ideal periods. The calculation unit 112a calculates the production periods of the respective products in the process to be processed (step S501). For example, the calculation unit 112a calculates the production period $T_{mn}$ of the product n in the process m by subtracting the starting time $ST_{mn}$ from the ending time $ET_{mn}$ of the product n in the process m to be processed. The calculation unit 112a calculates the ideal period of the process m (step S502). For example, the calculation unit 112a determines the shortest production period out of the production period $T_{mn}$ as the ideal period $T_m$. The calculation unit 112a determines whether the ideal period $T_m$ is calculated for all of the processes (step S503). If the ideal period $T_m$ is not calculated for all of the processes (No at step S503), the calculation unit 112a performs the processing at steps S501 and S502 on the process the ideal period $T_m$ of which is not calculated. If the ideal period $T_m$ is calculated for all of the processes (Yes at step S503), the calculation unit 112a ends the processing.

Figure 24:
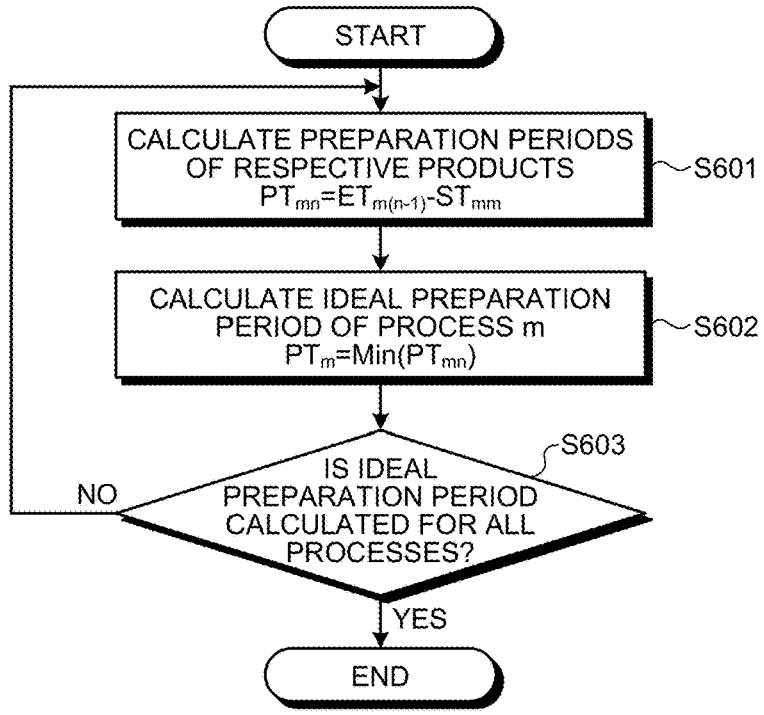
FIG. 24 is a flowchart for explaining an example of a flow of the processing performed by the display device according to the second embodiment to calculate ideal preparation periods.

With reference to FIG. 24, the following describes a flow of the processing performed by the calculation unit 112a to calculate the ideal preparation periods. FIG. 24 is a flowchart for explaining an example of the flow of the processing performed by the display device according to the second embodiment to calculate the ideal preparation periods. The calculation unit 112a calculates the preparation periods of the respective products in the process to be processed (step S601). For example, the calculation unit 112a calculates the preparation period $PT_{mn}$ of the product n in the process m by subtracting the starting time $ST_{mn}$ of the product n from the ending time $ET_{m(n-1)}$ of the product (n−1) in the process m to be processed. The calculation unit 112a calculates the ideal preparation period of the process m (step S602). For example, the calculation unit 112a determines the shortest preparation period out of the preparation period $PT_{mn}$ as the ideal preparation period $PT_m$. The calculation unit 112a determines whether the ideal preparation period $PT_m$ is calculated for all of the processes (step S603). If the ideal preparation period $PT_m$ is not calculated for all of the processes (No at step S603), the calculation unit 112a performs the processing at steps S601 and S602 on the process the ideal preparation period $PT_m$ of which is not calculated. If the ideal preparation period $PT_m$ is calculated for all of the processes (Yes at step S603), the calculation unit 112a ends the processing.

Figure 25:
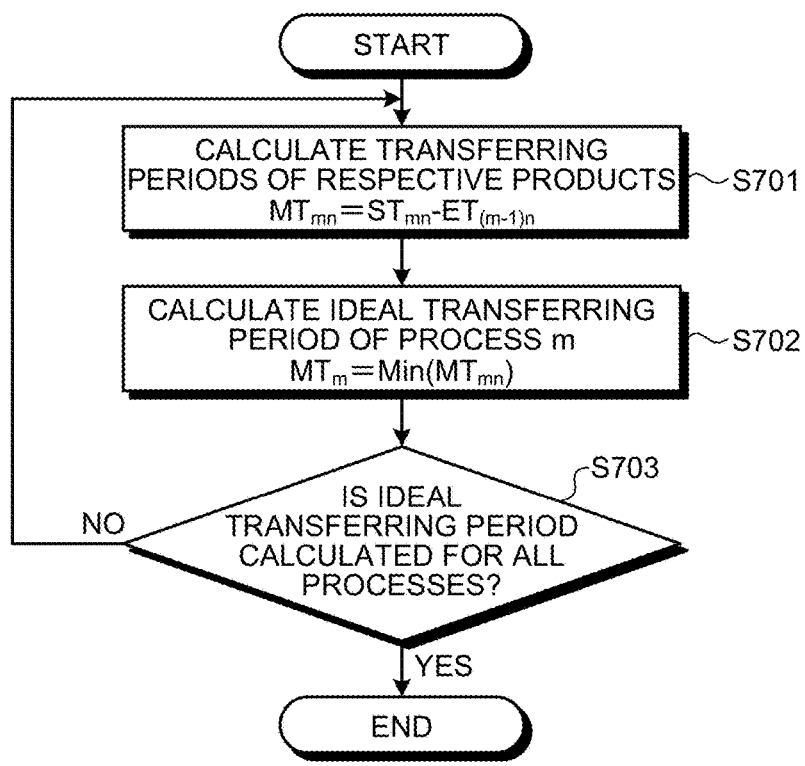
FIG. 25 is a flowchart for explaining an example of a flow of the processing performed by the display device according to the second embodiment to calculate ideal transferring periods.

With reference to FIG. 25, the following describes a flow of the processing performed by the calculation unit 112a to calculate the ideal transferring periods. FIG. 25 is a flowchart for explaining an example of the flow of the processing performed by the display device according to the second embodiment to calculate the ideal transferring periods. The calculation unit 112a calculates the transferring periods of the respective products in the process to be processed (step S701). For example, the calculation unit 112a calculates the transferring period $MT_{mn}$ of the product n in the process m by subtracting the ending time $ET_{(m-1)n}$ of the product n in the process (m−1) from the starting time $ST_{mn}$ of the product n in the process m to be processed. The calculation unit 112a calculates the ideal transferring period of the process m (step S702). For example, the calculation unit 112a determines the shortest transferring period out of the transferring period $MT_{mn}$ as the ideal transferring period $MT_m$. The calculation unit 112a determines whether the ideal transferring period $MT_m$ is calculated for all of the processes (step S703). If the ideal transferring period $MT_m$ is not calculated for all of the processes (No at step S703), the calculation unit 112a performs the processing at steps S701 and S702 on the process the ideal transferring period $MT_m$ of which is not calculated. If the ideal transferring period $MT_m$ is calculated for all of the processes (Yes at step S703), the calculation unit 112a ends the processing.

Figure 26:
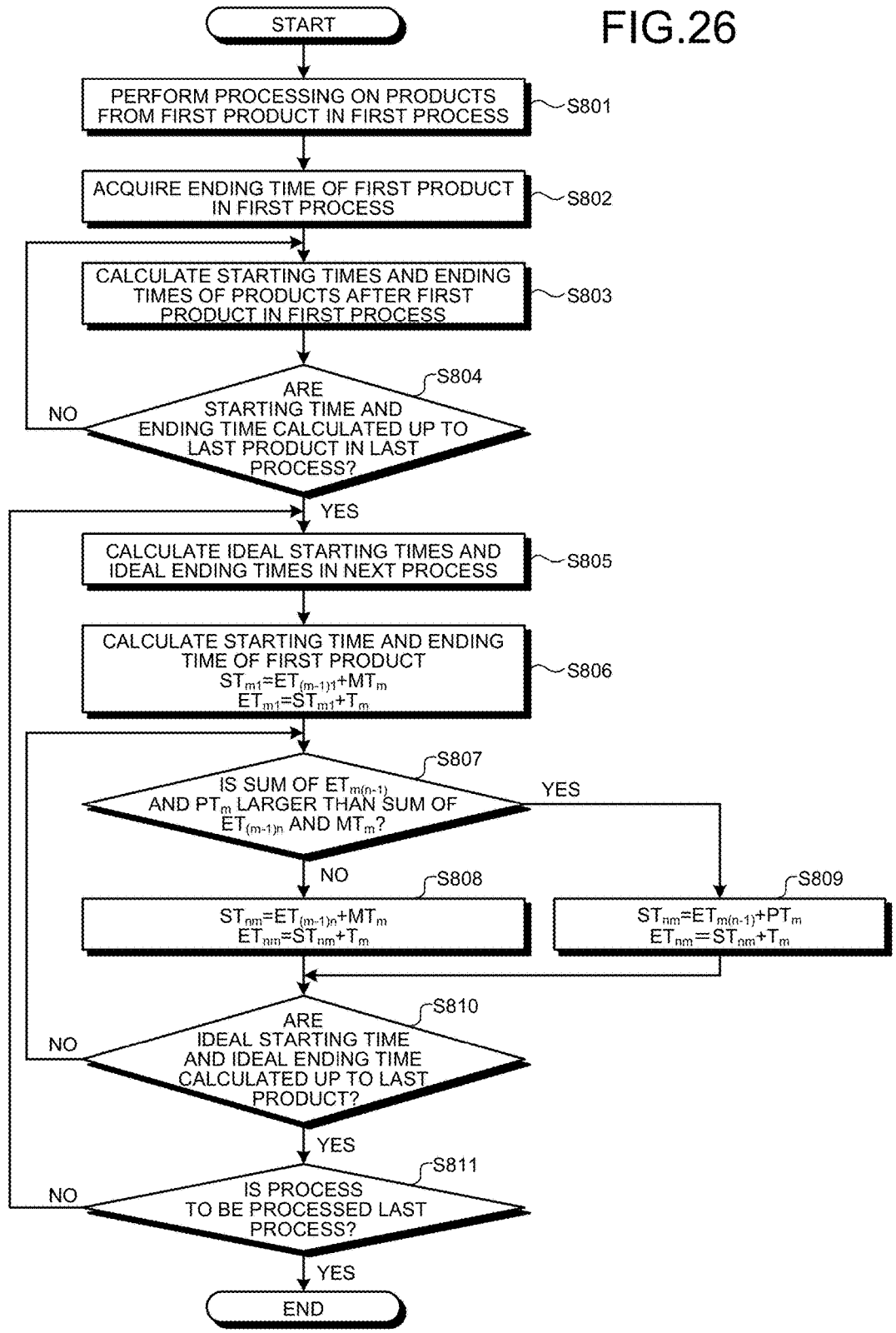
FIG. 26 is a flowchart for explaining an example of a flow of the processing performed by the display device according to the second embodiment to produce the ideal data.

With reference to FIG. 26, the following describes a flow of the processing performed by the calculation unit 112a to produce the ideal data. FIG. 26 is a flowchart explaining an example of a flow of the processing performed by the display device according to the second embodiment to produce the ideal data. The calculation unit 112a performs the processing at steps S802 to S811 on the respective products from the first product in the first process (step S801). The calculation unit 112a acquires the ending time of the first product in the first process (step S802). The calculation unit 112a calculates the ideal starting times and the ideal ending times of the products following the first product in the first process (step S803). For example, the calculation unit 112a adds the ideal preparation period of the first process to the ending time of the first product in the first process and determines the resulting value as the starting time of the product next to the first product while the calculation unit 112a adds the ideal period to the resulting starting time and determines the resulting value as the ending time of the product next to the first product. The calculation unit 112a determines whether the starting time and the ending time are calculated up to the last product in the first process (step S804). If the starting time and the ending time are not calculated up to the last product in the first process (No at step S804), the calculation unit 112a repeats the processing at step S803 to calculate the starting time and the ending time up to the last product in the first process.

If the starting time and the ending time are calculated up to the last product in the first process (Yes at step S804), the calculation unit 112a calculates the ideal starting times and ending times of the respective products in the next process (step S805). The calculation unit 112a calculates the ideal starting time and the ideal ending time of the first product in the process m to be processed (step S806). For example, the calculation unit 112a adds the ideal transferring period $MT_m$ to the ending time $ET_{(m-1)1}$ of the first product in the process (m−1) and determines the resulting value as the starting time $ST_{m1}$ of the first product. The calculation unit 112a adds the ideal period $T_m$ to the starting time $ST_{m1}$ and determines the resulting value as the ending time $ET_{m1}$.

The calculation unit 112a determines whether $ET_{m(n-1)}+PT_m$ is larger than $ET_{(m-1)n}+MT_m$ (step S807). If $ET_{m(n-1)}+PT_m$ is not larger than $ET_{(m-1)n}+MT_m$ (No at step S807), the calculation unit 112a determines the sum of $ET_{(m-1)n}$ and $MT_m$ as the ideal starting time $ST_{mn}$. The calculation unit 112a determines the sum of $ST_{nm}$ and $T_m$ as the ideal ending time $ET_{nm}$ (step S808). If the sum of $ET_{m(n-1)}$ and $PT_m$ is larger than the sum of $ET_{(m-1)n}$ and $MT_m$ (Yes at step S807), the calculation unit 112 determines the sum of $ET_{m(n-1)}$ and $PT_m$ as the ideal starting time $ST_{nm}$ and the sum of $ST_{mn}$ and $T_m$ as $ET_{mn}$ (step S809).

The calculation unit 112a determines whether the ideal starting time and the ideal ending time are calculated up to the last product (step S810). If the ideal starting time and the ideal ending time are not calculated up to the last product (No at step S810), the calculation unit 112a performs the processing at step S807 on the next product. If the ideal starting time and the ideal ending time are calculated up to the last product (Yes at step S810), the calculation unit 112a determines whether the process to be processed is the last process (step S811). If the process to be processed is not the last process (No at step S811), the calculation unit 112a performs the processing at step S805. If the process to be processed is the last process (Yes at step S811), the calculation unit 112a ends the processing.

Advantageous Effects of Display Device of Second Embodiment

As described above, the display device 100a calculates the ideal periods, the ideal preparation periods, and the ideal transferring periods of the respective processes. The display device 100a calculates the ideal starting times and the ideal ending times of the products in the respective processes using the ideal periods, the ideal preparation periods, and the ideal transferring periods of the respective processes. The display device 100a places the points indicating the ideal starting times and the ideal ending times in the respective processes on the temporal axes of the respective processes and places the lines connecting the corresponding placed points, for each product. The display device 100a then displays the graph in which the areas each interposed between the two placed lines are displayed in a visible state such that the graph overlaps with the graph indicating the actual manufacturing status. As a result, the display device 100 can display the graph that allows a user to readily visually recognize abnormalities in the manufacturing status.

[c] Third Embodiment

The following describes other examples that are applicable to the first and the second embodiments.

Display Examples of the Graph Indicating Ideal Manufacturing Status

In the first embodiment, the display device 100 produces, as the graph indicating the actual manufacturing status, the graph in which the lines connecting the ending times of the products in the respective processes are placed. The display device 100 displays the line connecting the ideal ending times of the first product in the respective processes and the line connecting the ideal ending times of the last product in the respective processes are indicated with the bolder lines than the lines in the graph indicating the actual manufacturing status. The display device 100 may display the areas, each of which is interposed between the line connecting the ideal ending times and the line connecting the ideal ending times in the respective processes, in relation to the first and the last products, by coloring the areas in certain colors, in the same manner as the display device 100a.

The display device 100a may display the line connecting the ideal ending times of the first product in the respective processes and the line connecting the ideal ending times of the last product in the respective processes such that the lines overlap with the graph indicating the actual manufacturing status, in the same manner as the display device 100. Any combination can be employed to combine the techniques to produce the graph indicating the actual manufacturing status and the graph indicating the ideal manufacturing status.

Adjustment Distances Between Temporal Axes

The placement units 113 and 113a may adjust the distances between the temporal axes such that the line connecting the starting times, the line connecting the ending times, or the upper side of the band becomes a straight line when the product is manufactured in respective standard manufacturing times. When such an adjustment is done and the product fails to be manufactured in the respective ideal periods, the displayed line or the displayed upper side of the band fails to become a straight line, thereby making it possible to cause a user to readily identify the process where a problem occurs in the manufacturing line. The ideal data may be preliminarily input by an administrator to the display device 100 and stored, or may be an average of the manufacturing times calculated from the logs.

Display of Reference Line or Band

The placement unit 113 may place a line connecting the starting times when the respective processes end in the respective ideal periods such that the line overlaps with the line or the band placed for each product. The display device 100 thus displays the line indicating the ideal starting times such that the line overlaps with the line or the band indicating the actual manufacturing status, thereby making it possible for a user to readily grasp a level of a delay in manufacturing.

Achievement of the Display Device 100

The display device 100 may be achieved by a single computer or a cloud computing system including a plurality of computers. For example, the computers included in a cloud computing system function as the identification unit 111, the calculation unit 112, and the placement unit 113 illustrated in FIG. 1 or the identification unit 111a, the calculation unit 112a, and the placement unit 113a illustrated in FIG. 17 so as to achieve the display device 100.

Hardware Structure of Display Terminal

Figure 27:
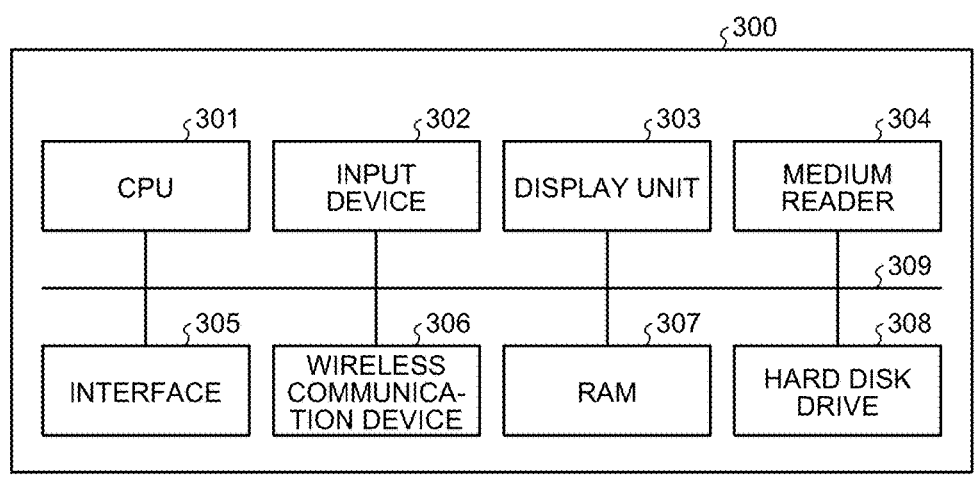
FIG. 27 is a schematic diagram illustrating a hardware structure of a computer related to the display device of the first or the second embodiment.

FIG. 27 is a schematic diagram illustrating a hardware structure of a computer related to the display device of the first or the second embodiment. As illustrated in FIG. 27, a computer 300 includes a CPU 301 that executes various types of arithmetic processing, an input device 302 that receives data input from a user, and a display unit 303. The computer 300 further includes a medium reader 304 that reads a program and the like from a storage medium, an interface 305 that connects the computer 300 to other devices, and a wireless communication device 306 that wirelessly connects the computer 300 to other devices. The computer 300 further includes a RAM 307 that temporarily stores therein various types of information and a hard disk drive 308. The respective components 301 to 308 are connected to a bus 309.

The hard disk drive 308 stores therein the same information as the production result log DB 121 illustrated in FIG. 1. The hard disk drive 308 stores therein a display program having the same functions as the identification unit 111, the calculation unit 112, and the placement unit 113 illustrated in FIG. 1 or the identification unit 111a, the calculation unit 112a, and the placement unit 113a illustrated in FIG. 17.

The CPU 301 reads the display program stored in the hard disk drive 308, loads the program to the RAM 307, and executes it, thereby performing various types of processing. This program can cause the computer 300 to function as the identification unit ill, the calculation unit 112, and the placement unit 113 illustrated in FIG. 1 or the identification unit 111a, the calculation unit 112a, and the placement unit 113a illustrated in FIG. 17.

The display program is not always requested to be stored in the hard disk drive 308. For example, the computer 300 may read the program stored in the storage medium readable by the computer 300 and execute the read program. Examples of the storage medium readable by the computer 300 include a portable recording medium such as a compact disc (CD)-ROM, a digital versatile disc (DVD), or a universal serial bus (USB) memory, a semiconductor memory such as a flash memory, and a hard disk drive. The program may be stored in a device connected to a public line, the Internet, or a local area network (LAN), for example, and the computer 300 may read the program from the device and execute the read program.

The invention can provide an advantage of allowing a user to readily visually recognize abnormalities in the manufacturing line.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display method to visualize a manufacturing status of products each manufactured through processing performed by a plurality of apparatuses included in a manufacturing line, the display method being implemented by at least a processor having memory having executable instructions stored thereon, which when executed by the processor, perform the display method, comprising:

identifying, for each product to be manufactured in a certain unit, a starting time or an ending time or both of the processing performed on the product by a first apparatus and a starting time or an ending time or both of the processing performed on the product by a second apparatus based on log information of the first apparatus and log information of the second apparatus, the first and the second apparatuses being included in the manufacturing line, the second apparatus performing the processing after the processing performed by the first apparatus, using the processor;

placing, on a first time axis, the starting time or the ending time or both identified for each product in the first apparatus, the first time axis indicating the starting time or the ending time or both of the processing performed on each product by the first apparatus, using the processor;

placing, on a second time axis, the starting time or the ending time or both identified for each product in the second apparatus, the second time axis indicating the starting time or the ending time or both of the processing performed on each product by the second apparatus, the second time axis being in parallel with the first time axis, using the processor;

placing, for each product, a line that connects a starting time or an ending time placed on the first time axis and a starting time or an ending time placed on the second time axis to produce a graph indicating an actual manufacturing status, using the processor; and displaying a first line and a second line such that the first line and the second line are allowed to overlap with the placed lines or displaying an area interposed between the first line and the second line such that the area is in a visible state and is allowed to overlap with the placed lines, the first line placing and connecting, in accordance with whether each of the first time axis and the second time axis indicates a starting time or an ending time of the processing performed on the product, a time at which the processing performed on a first product by the first apparatus is to start or end and another time at which the processing performed on the first product by the second apparatus is to start or end, the times being times when the first product is, in an ideal period of the processing, processed by both of the first and the second apparatuses, the first product being manufactured first in the certain unit, the second line placing and connecting, in accordance with whether each of the first time axis and the second time axis indicates a starting time or an ending time of the processing performed on the product, a time at which the processing performed on a second product by the first apparatus is to start or end and another time at which the processing performed on the second product by the second apparatus is to start or end, the times being times when all of the products included in the certain unit are, in an ideal period of the processing, processed by both of the first and the second apparatuses, the second product being manufactured last in the certain unit, using the processor.

2. The display method according to claim 1, wherein the displaying the area interposed between the first and the second lines includes:

calculating a first period that is the ideal period of the processing performed on the product out of periods of the processing performed by the first apparatus and a second period that is the ideal period of the processing performed on the product out of periods of the processing performed by the second apparatus based on the log information about the processing performed by the first apparatus and the log information about the processing performed by the second apparatus, using the processor; and calculating times at which the processing performed on the first and the second products by each of the first and the second apparatuses is to start or end based on the first period and the second period, using the processor.

3. The display method according to claim 2, wherein the calculating the second period includes:

identifying, for a third product that is not a product manufactured last in the certain unit and a fourth product that is a product manufactured next to the third product out of a plurality of the products, a later time either a time at which the first apparatus ends the processing of the fourth product or a time at which the second apparatus ends the processing of the third product as the starting time of the processing performed on the fourth product by the second apparatus, using the processor;

calculating a period from the identified time to a time at which the second apparatus ends the processing performed on the fourth product, using the processor; and determining the ideal period of the processing out of the periods calculated for each of the product on which the period is able to be calculated out of a plurality of the products as the second period, using the processor.

4. The display method according to claim 2, wherein the calculating the first period includes:

identifying, for a third product that is not a product manufactured last in the certain unit and a fourth product that is a product manufactured next to the third product out of a plurality of the products, an earlier time either a time at which the first apparatus starts the processing of the fourth product or a time at which the second apparatus starts the processing of the third product as the ending time of the processing performed on the third product by the first apparatus, using the processor;

calculating a period from a time at which the first apparatus starts the processing performed on the third product to the identified time, using the processor; and determining the ideal period of the processing out of the periods calculated for each of the product on which the period is able to be calculated out of a plurality of the products as the first period, using the processor.

5. The display method according to claim 2, wherein the displaying the area interposed between the first and the second lines includes:

calculating, for each apparatus included in the manufacturing line, an ideal period of the processing for processing each product, an ideal time for preparing the processing, and an ideal time for transferring the product to an apparatus that performs the next processing on the product, using the processor;

placing, on the first and the second time axes, ideal starting times at which the processing performed on the first product by each of the first and the second apparatuses starts and ideal ending times at which the processing performed on the first product by each of the first and the second apparatuses ends, using the ideal period of the processing for processing each product, the ideal time for preparing the processing, and the ideal time for transferring the product to the apparatus that performs the next processing on the product, when the first product is processed in the ideal period of the processing by both of the first and the second apparatuses, and regarding an area interposed between a line connecting the ideal starting times and a line connecting the ideal ending times as a line and setting the line as the first line, using the processor; and placing, on the first and the second time axes, ideal starting times at which the processing performed on the second product by each of the first and the second apparatuses starts and ideal ending times at which the processing performed on the second product by each of the first and the second apparatuses ends, when all of the products are processed in the ideal period of the processing by both of the first and the second apparatuses, and regarding an area interposed between a line connecting the ideal starting times and a line connecting the ideal ending times as a line and setting the line as the second line, using the processor.

6. A display device comprising:

a memory; and a processor coupled to the memory, wherein the processor is configured:

to identify, for each product to be manufactured in a certain unit, a starting time or an ending time or both of processing performed on the product by a first apparatus and a starting time or an ending time or both of processing performed on the product by a second apparatus based on log information of the first apparatus and log information of the second apparatus, the first and the second apparatuses being included in a manufacturing line, the second apparatus performing the processing after the processing performed by the first apparatus;

to place, on a first time axis, the starting time or the ending time or both identified for each product in the first apparatus, the first time axis indicating the starting time or the ending time or both of the processing performed on each product by the first apparatus; place, on a second time axis, the starting time or the ending time or both identified for each product in the second apparatus, the second time axis indicating the starting time or the ending time or both of the processing performed on each product by the second apparatus, the second time axis being in parallel with the first time axis; and place, for each product, a line that connects a starting time or an ending time placed on the first time axis and a starting time or an ending time placed on the second time axis to produce a graph indicating an actual manufacturing status; and to display a first line and a second line such that the first line and the second line are allowed to overlap with the placed lines or display an area interposed between the first line and the second line such that the area is in a visible state and is allowed to overlap with the placed lines, the first line placing and connecting, in accordance with whether each of the first time axis and the second time axis indicates a starting time or an ending time of the processing performed on the product, a time at which the processing performed on a first product by the first apparatus is to start or end and another time at which the processing performed on the first product by the second apparatus is to start or end, the times being times when the first product is, in an ideal period of the processing, processed by both of the first and the second apparatuses, the first product being manufactured first in the certain unit, the second line placing and connecting, in accordance with whether each of the first time axis and the second time axis indicates a starting time or an ending time of the processing performed on the product, a time at which the processing performed on a second product by the first apparatus is to start or end and another time at which the processing performed on the second product by the second apparatus is to start or end, the times being times when all of the products included in the certain unit are, in an ideal period of the processing, processed by both of the first and the second apparatuses, the second product being manufactured last in the certain unit.

7. A non-transitory computer-readable recording medium having stored therein a program that causes a computer to execute a display process comprising:

identifying, for each product to be manufactured in a certain unit, a starting time or an ending time or both of processing performed on the product by a first apparatus and a starting time or an ending time or both of processing performed on the product by a second apparatus based on log information of the first apparatus and log information of the second apparatus, the first and the second apparatuses being included in a manufacturing line, the second apparatus performing the processing after the processing performed by the first apparatus;

placing, on a first time axis, the starting time or the ending time or both identified for each product in the first apparatus, the first time axis indicating the starting time or the ending time or both of the processing performed on each product by the first apparatus;

placing, on a second time axis, the starting time or the ending time or both identified for each product in the second apparatus, the second time axis indicating the starting time or the ending time or both of the processing performed on each product by the second apparatus, the second time axis being in parallel with the first time axis;

placing, for each product, a line that connects a starting time or an ending time a point placed on the first time axis and a starting time or an ending time placed on the second time axis to produce a graph indicating an actual manufacturing status; and displaying a first line and a second line such that the first line and the second line are allowed to overlap with the placed lines or displaying an area interposed between the first line and the second line such that the area is in a visible state and is allowed to overlap with the placed lines, the first line placing and connecting, in accordance with whether each of the first time axis and the second time axis indicates a starting time or an ending time of the processing performed on the product, a time at which the processing performed on a first product by the first apparatus is to start or end and another time at which the processing performed on the first product by the second apparatus is to start or end, the times being times when the first product is, in an ideal period of the processing, processed by both of the first and the second apparatuses, the first product being manufactured first in the certain unit, the second line placing and connecting, in accordance with whether each of the first time axis and the second time axis indicates a starting time or an ending time of the processing performed on the product, a time at which the processing performed on a second product by the first apparatus is to start or end and another time at which the processing performed on the second product by the second apparatus is to start or end, the times being times when all of the products included in the certain unit are, in an ideal period of the processing, processed by both of the first and the second apparatuses, the second product being manufactured last in the certain unit.

* * * * *